(12) United States Patent
Irvine et al.

(10) Patent No.: US 10,062,034 B2
(45) Date of Patent: Aug. 28, 2018

(54) METHOD AND SYSTEM FOR OBTAINING AND ANALYZING INFORMATION FROM A PLURALITY OF SOURCES

(71) Applicant: The Charles Stark Draper Laboratory, Inc., Cambridge, MA (US)

(72) Inventors: John Irvine, Somerville, MA (US); Mark Abramson, Lexington, MA (US); Seamus Tuohy, Newton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 45 days.

(21) Appl. No.: 15/171,158

(22) Filed: Jun. 2, 2016

(65) Prior Publication Data

US 2016/0358090 A1    Dec. 8, 2016

Related U.S. Application Data

(60) Provisional application No. 62/172,612, filed on Jun. 8, 2015.

(51) Int. Cl.
*G06Q 10/10* (2012.01)
*G06Q 40/08* (2012.01)
(Continued)

(52) U.S. Cl.
CPC ............. *G06N 7/005* (2013.01); *G06N 5/045* (2013.01); *G06N 99/005* (2013.01); *G06Q 50/26* (2013.01); *G06Q 50/265* (2013.01)

(58) Field of Classification Search
CPC .................................................. G06Q 50/26
(Continued)

(56) References Cited

U.S. PATENT DOCUMENTS 6,571,279 B1 *    5/2003    Herz ................. G06F 17/30867
                                            707/999.01
9,189,514 B1 *    11/2015    Myslinski .......... G06Q 30/0255
(Continued)

OTHER PUBLICATIONS

Budescu et al., "A model-based approach for analysis of calibration of probability judgements," Judgment and Decision Making, vol. 6, No. 8, Dec. 2011, pp. 857-869.*
(Continued)

*Primary Examiner* — Jonathan P Ouellette
(74) *Attorney, Agent, or Firm* — Hamilton, Brook, Smith & Reynolds, P.C.

(57) ABSTRACT

Methods and systems are disclosed for obtaining and analyzing information to determine an estimated state of a real world. First information is obtained from a first source of a plurality of sources (e.g., data stores, real-time data streams, or information services), where the first information is potentially indicative of first and second states of the real world. If the first information exceeds a first decision threshold, then the estimated state is the first state, and if the first information exceeds a second decision threshold, then the estimated state is the second state. If the first information does not exceed either of the first and second decision thresholds, then second information is obtained from a second source. Obtaining the second information is based on whether the second source includes information that is relevant to the estimated state and whether the second source includes information that is redundant with the first information.

9 Claims, 15 Drawing Sheets

(51) Int. Cl.
*G06N 7/00* (2006.01)
*G06Q 50/26* (2012.01)
*G06N 5/04* (2006.01)
*G06N 99/00* (2010.01)

(58) Field of Classification Search
USPC .................................................. 705/1.1–912
See application file for complete search history.

(56) References Cited

U.S. PATENT DOCUMENTS

| | | | | |
|---|---|---|---|---|
| 2009/0172035 A1* | 7/2009 | Lessing | ............. | G06F 17/30595 |
| 2009/0207020 A1* | 8/2009 | Garnier | ................. | G08B 21/12 |
| | | | | 340/541 |
| 2009/0254971 A1* | 10/2009 | Herz | ..................... | G06Q 10/10 |
| | | | | 726/1 |
| 2010/0283626 A1* | 11/2010 | Breed | ..................... | B60C 11/24 |
| | | | | 340/8.1 |
| 2011/0267222 A1* | 11/2011 | Craig | ................... | G01S 13/878 |
| | | | | 342/25 B |
| 2012/0290950 A1* | 11/2012 | Rapaport | ................ | H04L 51/32 |
| | | | | 715/753 |
| 2013/0036117 A1* | 2/2013 | Fisher | ................ | G06F 17/30041 |
| | | | | 707/736 |
| 2014/0214895 A1* | 7/2014 | Higgins | ............ | G06F 17/30646 |
| | | | | 707/770 |
| 2015/0088603 A1* | 3/2015 | Romero | ............. | G06Q 30/0201 |
| | | | | 705/7.29 |
| 2015/0363481 A1* | 12/2015 | Haynes | .................. | G06Q 10/10 |
| | | | | 707/748 |
| 2016/0163186 A1* | 6/2016 | Davidson | ............... | G06Q 50/16 |
| | | | | 340/506 |

OTHER PUBLICATIONS

Satopaa et al., "Partial Information Framework: Aggregating Estimates from Diverse Information Sources," May 24, 2015, pp. 1-30.*
Pablo A. Estévez et al., "Normalized Mutual Information Feature Selection", IEEE Transactions on Neural Networks, vol. 20, No. 2, pp. 189-201, Feb. 2009.
Peng et al., "Feature Selection Based on Mutual Information: Criteria of Max-Dependency, Max-Relevance, and Min-Redundancy", IEEE Transactions on Pattern Analysis and Machine Intelligence, vol. 27, No. 8, pp. 1226-1238, Aug. 2005.

* cited by examiner

METHOD AND SYSTEM FOR OBTAINING AND ANALYZING INFORMATION FROM A PLURALITY OF SOURCES

RELATED APPLICATION

This application claims the benefit of U.S. Provisional Application No. 62/172,612, filed on Jun. 8, 2015. The entire teachings of the above application are incorporated herein by reference.

BACKGROUND

Many analytic problems arising in today's world require collecting, merging, and synthesizing information from diverse sources. Many times, no single source or data type holds the answer, and analysts must piece together shards of evidence to uncover the story. This multi-source analysis creates two interrelated methodological challenges: how best to combine information from these disparate types of data, and how to identify additional data types or sources that can provide better understanding.

SUMMARY OF THE INVENTION

The methods and systems disclosed herein address both of these challenges within a unified mathematical-based methodology. One example embodiment of the present invention is a method of obtaining and analyzing information to determine an estimated state of a real world (e.g., a real-world physical environment). According to the method, a processor obtains first information from a first source of a plurality of sources, where the first information is potentially indicative of a first state and a second state of the real world. If the first information exceeds a first decision threshold, then the processor determines that the estimated state is the first state, and if the first information exceeds a second decision threshold, then the processor determines that the estimated state is the second state. If the first information does not exceed either of the first and second decision thresholds, then the processor obtains second information from a second source and determines whether the estimated state is the first state or the second state based on whether the first information and the second information together exceeds the first decision threshold or the second decision threshold. In obtaining the second information, the processor determines whether the second source includes information that is relevant to the estimated state and whether the second source includes information that is redundant with the first information. The plurality of sources may include, for example, a data store, a real-time data stream, or a service from which information can be requested. After the processor determines whether the estimated state is the first state or the second state, the processor can output the determination in a variety of ways, including, for example, raising an alert, notification, other visual display (e.g., highlighting certain text on a display), or audio output on a user's computer that indicates the determined state, sounding an alarm, or sending an e-mail, voice message, or text message.

In some embodiments, determining whether the second source includes information that is relevant to the estimated state can include determining a "relevant score" by calculating a divergence between (i) a joint density of the second information and the estimated state and (ii) the product of the densities of the second information and the estimated state. Such embodiments can also include determining a "redundant score" by calculating a divergence between (i) a joint density of the second information and the first information and (ii) the product of the densities of the second information and the first information. In such embodiments, the processor can determine whether the second source includes information that is more relevant and less redundant than other sources of the plurality of sources by, for each source, subtracting from the relevant score corresponding to the source, the redundant score corresponding to the source and a cost of obtaining the information from the source, resulting in an overall score for each source. The processor then selects the second source if the overall score for the second source is greater than each overall score of the other sources. In some embodiments, the redundant scores and the costs of obtaining the information may be weighted.

In a particular embodiment, the real world includes a plurality of ships traveling in a body of water, the estimated state is whether a particular ship of the plurality of ships is a drug smuggler, the first state is that the ship is a drug smuggler, the second state is that the ship is not a drug smuggler, the first information includes information regarding the type of the particular ship, and the second information includes information regarding the route of the particular ship.

Another example embodiment of the present invention is a system for obtaining and analyzing information to determine an estimated state of a real world. The system includes a plurality of sources, an interface, and a processor. The plurality of sources can include any of a data store, a real-time data stream, and a service from which information can be requested. The sources include first and second sources that include respective first and second information potentially indicative of a first state and a second state of the real world. The interface is in communication with the plurality of sources and is configured to obtain information from the plurality of sources. The processor is in communication with the interface and configured to (i) if the first information exceeds a first decision threshold, determine that the estimated state is the first state, (ii) if the first information exceeds a second decision threshold, determine that the estimated state is the second state, and (iii) if the first information does not exceed either of the first or second decision thresholds, obtain second information from a second source and determine whether the estimated state is the first state or the second state based on whether the first information and the second information together exceeds the first decision threshold or the second decision threshold. In obtaining the second information, the processor determines whether the second source includes information that is relevant to the estimated state and whether the second source includes information that is redundant with the first information. After the processor determines whether the estimated state is the first state or the second state, the processor can output the determination in a variety of ways, including, for example, raising an alert, notification, other visual display (e.g., highlighting certain text on a display), or audio output on a user's computer that indicates the determined state, sounding an alarm, or sending an e-mail, voice message, or text message.

Yet another example embodiment of the present invention is a machine readable storage medium having stored thereon a computer program for obtaining and analyzing information to determine an estimated state of a real world. The computer program includes a routine of set instructions for causing the machine to (i) obtain first information from a first source of a plurality of sources in a database, where the first information is potentially indicative of a first state and a second state of the real world, (ii) if the first information exceeds a first decision threshold, determine that the estimated state is the first state, (iii) if the first information exceeds a second decision threshold, determine that the estimated state is the second state, and (iv) if the first information does not exceed either of the first or second decision thresholds, obtain second information from a second source and determine whether the estimated state is the first or second state based on whether the first and second information together exceeds the first decision threshold or the second decision threshold. In obtaining the second information, the computer program includes a routine of set instructions for causing the machine to determine whether the second source includes information that is relevant to the estimated state and determine whether the second source includes information that is redundant with the first information. After it is determined whether the estimated state is the first state or the second state, the machine can output the determination in a variety of ways, including, for example, raising an alert, notification, other visual display (e.g., highlighting certain text on a display), or audio output on the machine that indicates the determined state, sounding an alarm, or sending an e-mail, voice message, or text message.

In other embodiments, a method or system obtains and analyzes information to predict a real world condition (i.e., predict state of a real world object). According to the method and system, a processor obtains first information from a first source of a plurality of sources, where the first information is potentially indicative of first and second states of the real world object. If the obtained first information exceeds a first decision threshold, then the processor determines that the real world object/condition is in the first state, and if the obtained first information exceeds a second decision threshold, then the processor determines that the real world object/condition is in the second state. If the obtained first information does not exceed either of the first and second decision thresholds, then the processor obtains second information from a second source. In obtaining the second information, the processor determines whether the second source includes information that is relevant to the real world object/condition and whether the second source includes information that is redundant with the obtained first information. Next the processor analyzes the obtained first information together with the obtained second information, and determines one of: (i) probabilities of the real world object/condition being in the first state and/or (ii) probabilities of the real world object/condition being in the second state. Based on the determined probabilities, the processor generates a prediction of the real world object/condition being in one of the first state and the second state. Alternatively, in other embodiments, the processor analyzes the obtained first information together with the obtained second information and determines one or more probable states of the real world object (one or more probable real world conditions). Based on the determined probable states/conditions, the processor generates a prediction of the current state of the real world object/condition. The processor can then cause an indication of the state prediction to be visually displayed or rendered in another medium (e.g., audio). Many embodiments of the present invention may feed the output from the processor into other system components, such as control or alarm systems, or may report the output to one or more system users.

For example, the real world object/condition can be a certain vessel (cargo ship, etc.). The first state may be the vessel carrying contraband, and the second state is the vessel being free of contraband. The plurality of sources may include, for example, a data store of waypoints and logs thereof, a real-time data stream from cell tracking sensors, surveillance detectors and the like, or a service from which cargo shipping information/business transactions/etc. can be requested.

In another example, the real world object/condition is Earth's environment and quality thereof (including land, air, and/or water). The first state may be evidence of: global climate change, pollution growth, or urban area growth. The second state may be lack of positive such evidence. One of the sources in the plurality of sources may be satellite data (images, etc.).

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
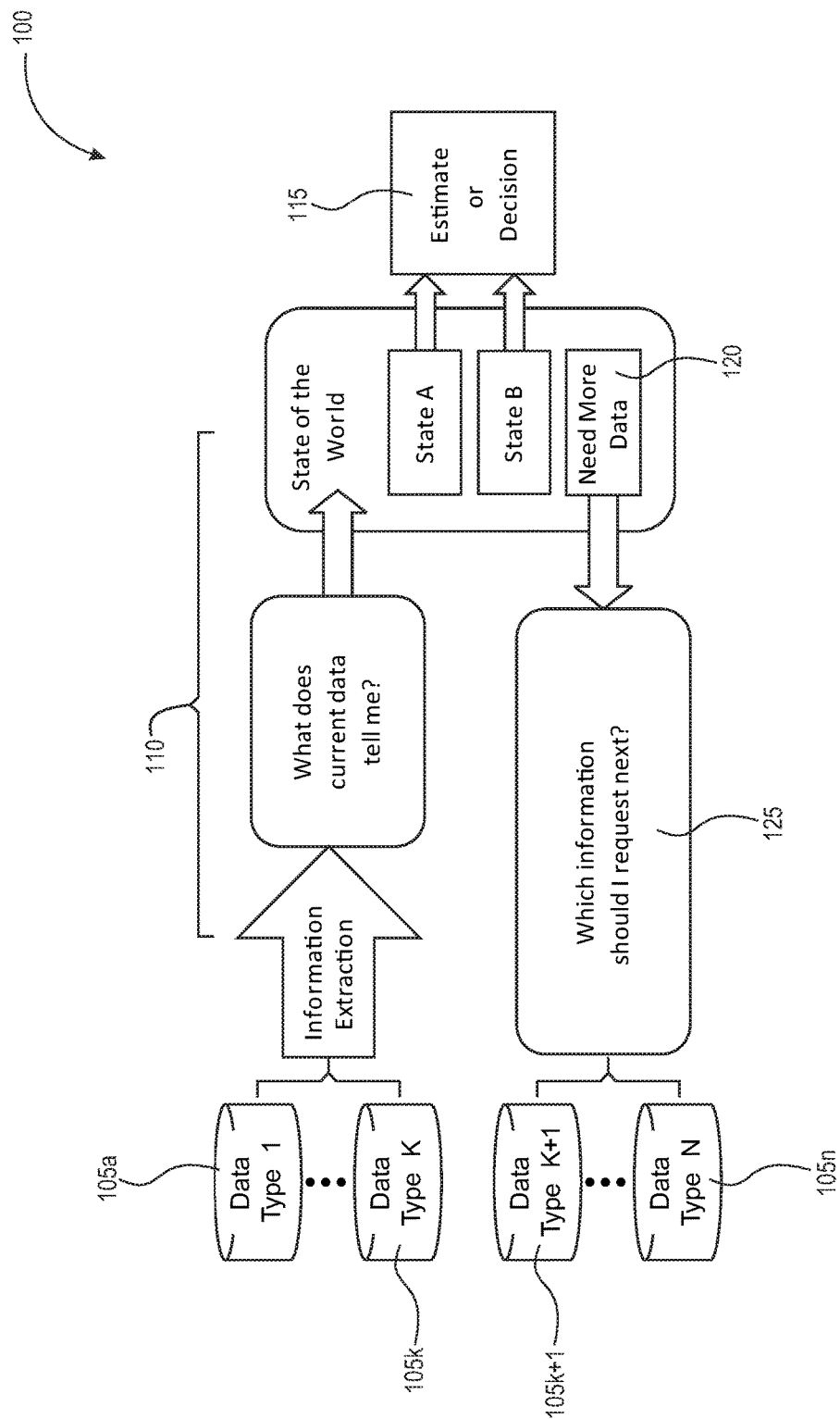
FIG. 1 is a flow chart illustrating obtaining and analyzing information to determine an estimated state of a real world, according to an example embodiment of the present invention.

A conceptual framework for the disclosed methods and systems is a closed-loop architecture. As illustrated in FIG. 1, drawing on one or more sets of available data 105a-n, an analytic processing method 100 accumulates and combines 110 the information to make an estimate about the state of a real world 115. If a decision can be achieved with high confidence, the process is complete. In many cases, however, the confidence is deemed lower than acceptable and there is a need to acquire additional information 120 to improve the analysis. At that point, a method based on information theory is applied to identify the next set of information to request 125. Probabilistic reasoning is used to combine information to assess the state of the world. This technique enables the combination of evidence (and associated uncertainties) from diverse sources as the information becomes available in real time. At any point, the analysis can determine whether the accumulated evidence supports a particular outcome or if the information is ambiguous. This approach has many applications; however, for simplicity, consider a simple intelligence problem in which the world could be in one of two states:

A: Activity is normal
B: There is a new threat

Each packet of data, regardless of the source, can provide evidence for state A, provide evidence for state B, or indicate ambiguity. To illustrate, suppose state A is that the weather if fine and state B indicates precipitation. Evidence about cloud cover or barometric pressure might support one state over the other, whereas the temperature could be ambiguous. By converting the evidence to a probabilistic representation, at any given time, the available data can be used to compute a test statistic. Depending on the value of this statistic, there is one of three possible decisions: the world is in State A, the world is in State B, or the evidence is ambiguous and additional information is needed.

If additional information is needed, an important consideration is which information would be most useful. The disclosed methods and systems identify the best next information to request based on two primary principles: First, information that is relevant to the intelligence question is desired. Second, new information over information that is redundant with the information already incorporated into the analysis is preferred. These two principles mean that the best next set of information is the one with maximum relevance and minimum redundancy. The disclosed methods and systems estimate relevance and redundancy using information theory.

Mathematical Details

Figure 2:
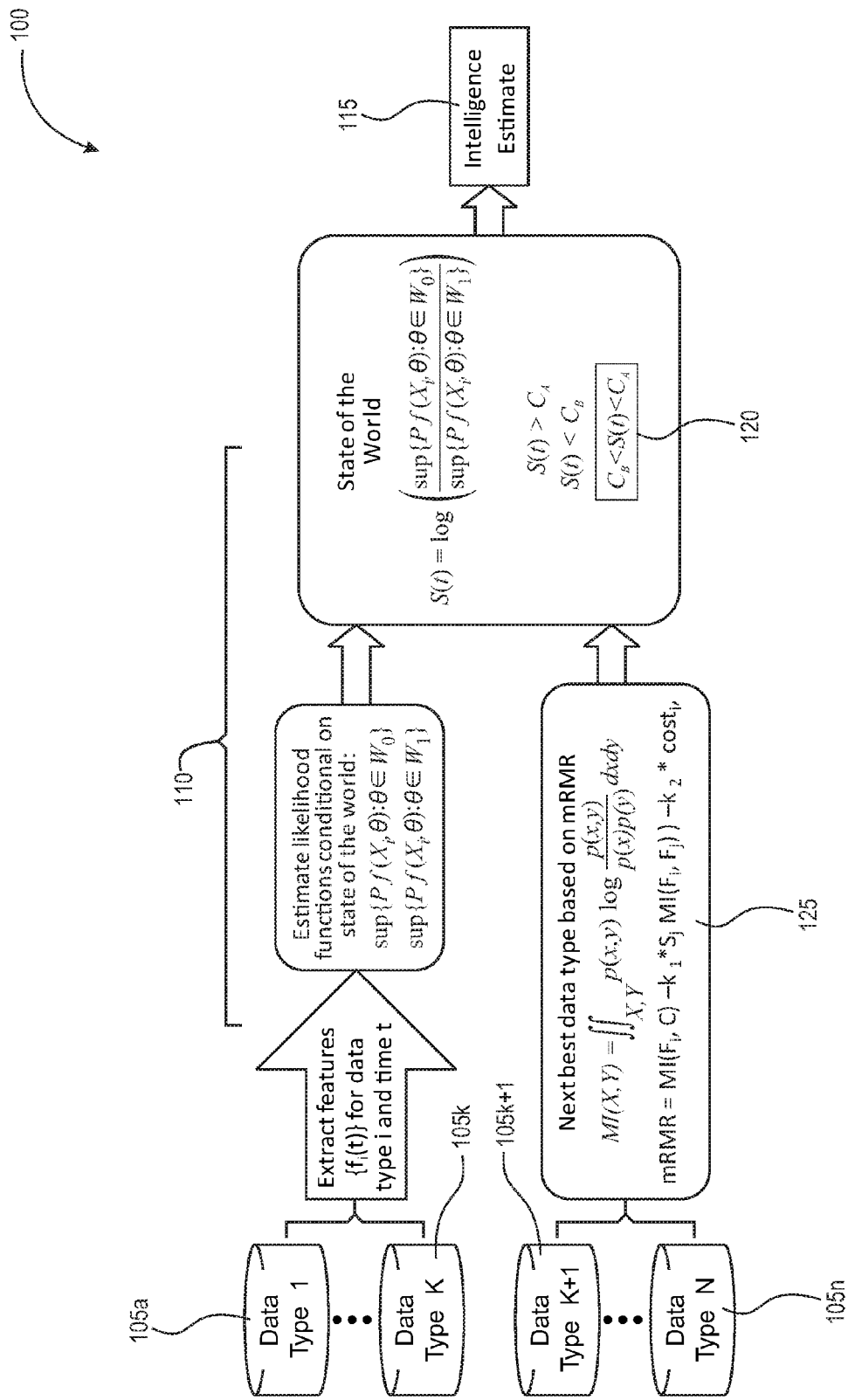
FIG. 2 is a flow chart illustrating obtaining and analyzing information to determine an estimated state of a real world, according to an example embodiment of the present invention, with mathematical annotations thereon.

The disclosed framework can be tailored to a number of specific applications. The analytic process involves converting raw data into useful evidence indicative of the state of the world. From each set of information the probabilities of state A and state B are computed, conditional on the value of the observed data. As shown in FIG. 2, this is the information extraction step and it produces estimates of the likelihood function conditional on the possible states of the world. The estimated likelihoods enable the computation of a likelihood ratio statistic S(t) (see 100 in FIG. 2) which leads to the decision:

| | |
|---|---|
| $S(t) > C_A$ | Indicates state A |
| $S(t) < C_B$ | Indicates state B |
| $C_B < S(t) < C_A$ | Evidence is ambiguous—ask for additional information |

The procedure depends on choices for $C_A$ and $C_B$, which quantify the acceptable levels of risk for a particular decision.

If the decision is to request additional information, the minimum redundancy maximum relevance (mRMR) principle is applied to select 125 the source. The estimate for relevance can be quantified by the mutual information between the individual type of information and the outcome of interest (i.e., the state of the world). The redundancy can be measured by the mutual information between two different data types. Thus, the value of mRMR for a given information type j is mutual information of information type j with outcome minus the maximum of the mutual information between information types i and j, for all i not equal to j. Ideally, these mutual information values can be estimated from training data. However, when training data is not available, expert judgment techniques can be applied to elicit estimates of these values.

A) State of the World: Accumulation of Evidence

A class of statistical methods known as sequential procedures forms the basis for accumulating evidence about the state of the world. Abraham Wald developed the sequential procedure for formal statistical testing of hypotheses in situations where data can be collected incrementally (see M. Ghosh, *Handbook of Sequential Analysis*, first edition ed.: CRC Press, 1991 and A. Wald, *Sequential Analysis*, Dover edition ed.: Dover Publications, 1994). In many instances, the sequential method arrives at a decision based on relatively few observations. Consider a sequence of independent and identically distributed random variables $\{X_1, X_2, \ldots\}$ and suppose the goal is to test the hypothesis H0: $X_i \sim f(X, \theta_0)$ against the alternative H1: $X_i \sim f(X, \theta_1)$. The general approach is to construct the sequential probability ratio statistic for the first T observations:

$$S(T) = \frac{P[X_1, \ldots, X_T | H_1]}{P[X_1, \ldots, X_T | H_0]} = \frac{\prod_{t=1}^{T} f(X_t, \theta_1)}{\prod_{t=1}^{T} f(X_t, \theta_0)} \qquad \text{Equation 1}$$

At each step in the sequential procedure, i.e., for each value of T=1, 2, . . . , the computed value of S(T) is compared to the decision thresholds A and B, where 0<A<1<B<∞. The values of A and B depend on the acceptable level of error in the test of hypothesis. The decision procedure is:

If S(T)<A, accept H0
If S(T)>B, accept H1
If A<S(T)<B, continue sampling

S(T) is known as the sequential probability ratio statistic. It is often convenient to formulate the procedure in terms of the log of the test statistic:

$$S^*(T) = \log[S(T)] = \sum_{t=1}^{T} \log[f(X_t, \theta_1)] - \sum_{t=1}^{T} \log[f(X_t, \theta_0)] \qquad \text{Equation 2}$$

To develop the sequential procedure for our application, identity verification can be treated as a test of hypotheses. The two hypotheses are:

H0: The state of the world is A
H1: The state of the world is B

Gaussian Case:

Translating the hypotheses into mathematical terms, the two states of the world can be represented by two underlying parameters $\theta_1$ and $\theta_0$. The data for testing the hypotheses is the series of observation that provide evidence about the state of the world. A common approach is to treat the world as Gaussian. In this formulation, observations (raw data) have been transformed into feature vectors which are treated as (approximately) Gaussian. The mean of the Gaussian distribution indicates the state of the world. Denote these feature vectors by $\{H(1), H(2), \ldots\}$. If the world is in state A, then $\{H(t): t=1, \ldots, T\}$ are drawn from the statistical distribution corresponding to one mean vector. Otherwise, $\{H(t): t=1, \ldots, T\}$ are drawn from a population with a statistical distribution corresponding to a different mean vector. Thus, it is assumed that the feature vectors $\{H(t)\}$ are independent with a K-variate Gaussian distribution, where K is the number of features extracted from the raw data. The mean vectors and covariance matrices can be estimated from the training data. Using this model for the test data, the hypotheses are restated in statistical terms:

$$H0: H(t) \sim \mathcal{N}(Y_i, \Sigma) \text{ For } \{H(t): t=1, \ldots, T\}, \quad \text{Equation 3}$$

$$H1: H(t) \sim \mathcal{N}(Y_j, \Sigma) \text{ where } i \neq j \text{ For } \{H(t): t=1, \ldots, T\} \quad \text{Equation 4}$$

where $Y_i$ is the mean feature vector for state A and $Y_j$ is the mean feature vector for state B. The covariance matrix $\Sigma$ is assumed to be the same although generalization to unequal covariance matrices is straightforward. Implicit in this formulation is the assumption the $Y_i \neq Y_j$. The distance between $Y_i$ and $Y_j$ sets the trade space for selecting features to use in the analysis.

To test the hypotheses H0 and H1, the log of the likelihood ratio statistic is calculated to determine whether the first T data samples are drawn from the statistical distribution representing H0 or H1. In the classical, Neyman-Pearson formulation of hypothesis testing, T would be fixed (see E. L. Lehmann and J. P. Romano, *Testing Statistical Hypotheses*, third edition ed.: Springer, 2008). In the sequential procedure, the test statistic is calculated for values of T until a decision is reached. Note that the methods depend on the Mahalanobis distance and Y is composed the K-element feature vector. The test statistic as a function of T is:

$$S^*(T) = \sum_{t=1}^{T} \log(f_1(H(t))) - \log(f_0(H(t))) \quad \text{Equation 5}$$

where:

$$f_0(H(t)) = [2\pi]^{-k/2} |\Sigma|^{-1/2} \exp\left[-\frac{1}{2}(H(t) - Y_i)^T \Sigma^{-1} (H(t) - Y_i)\right] \quad \text{Equation 6}$$

and $$f_1(H(t)) = [2\pi]^{-k/2} |\Sigma|^{-1/2} \exp\left[-\frac{1}{2}(H(t) - Y_j)^T \Sigma^{-1} (H(t) - Y_j)\right] \quad \text{Equation 7}$$

where K is the dimensionality of the vectors and $Y_j$ is the mean for the alternative hypothesis. Computing $S^*(T)$ requires calculating Equation 6 and 7 for each observation, multiplying, and taking logs to compute the value defined in Equation 5. Computationally, this can be simplified. The term $[2\pi]^{-k/2} |\Sigma|^{-1/2}$ is a constant that gets added and subtracted, so it can be ignored. The test procedure simplifies to calculating the quadratic forms (Equation 8, 9, and 10):

$$f_0(H(t)) \propto -\frac{1}{2}(H(t) - Y_i)^T \Sigma^{-1} (H(t) - Y_i) \quad \text{Equation 8}$$

and $$f_1(H(t)) \propto -\frac{1}{2}(H(t) - Y_j)^T \Sigma^{-1} (H(t) - Y_j) \quad \text{Equation 9}$$

Sum up values to compute $S^*(T)$ for each value of T, i.e., $$S^*(T) = \Sigma_{t=1}^{T} \log[f_1(H(t))] - \log[f_0(H(t))] \quad \text{Equation 10}$$

The result of all this is a series of values for $S^*(T)$ for $T=1, 2, 3, \ldots$. Comparing $S^*(T)$ to the critical values determines which hypothesis to accept. The errors $\alpha$ and $\beta$ can be defined as follows (Equation 11 and 12):

$$\alpha = Pr\{\text{Rejecting } H0 | H0 \text{ is true}\} = Pr\{S^*(T) > \log(B)\} \quad \text{Equation 11}$$

and $$\beta = Pr\{\text{Rejecting } H1 | H1 \text{ is true}\} = Pr\{S^*(T) < \log(A)\} \quad \text{Equation 12}$$

For a test of simple hypothesis, it has been shown that (Equation 13 and 14)

$$\log(A) = \log\left[\frac{\beta}{1-\alpha}\right] \quad \text{Equation 13}$$

and $$\log(B) = \log\left[\frac{1-\beta}{\alpha}\right] \quad \text{Equation 14}$$

Binary Case:

The process described above treats the observations as K-variate Gaussian. This approach assumes that raw data have been transformed into features or attributes that are informative about the state of the world. Implicit in this approach is that these features are derived from a set of raw data, so that the Central Limit Theorem supports the Gaussian assumption. An alternative to the Gaussian formulation arises when the data represent discrete binary values. If the transformation of the raw data is, for example, a classifier rather than a set of features, the observation H(t) is now a discrete value (0 or 1) representing the class to which the data are assigned. Yet another variant is that the observation is the estimated probability that the data belong to each class. Many classifiers generate this type of output that indicates the estimated likelihood of the data belonging to a specific class given the observations. Thus, these probabilities represent the likelihood values conditional on the state of the world. This process based on classifier output was the method implemented.

To spell out the details of the implementation, consider binary decision problems with possible choices A and B. Let $P(i,t)$ be conditional probability of A based on source i at time t. Compute a statistic $S(t) = S[P(1,t), \ldots, P(K,t)]$. Then, the decision is:

| | |
|---|---|
| S(t) > $C_A$ | select outcome A |
| S(t) < $C_B$ | select outcome B |
| $C_B$ < S(t) < $C_A$ | task for more data |

The procedure depends on choices for $C_A$ and $C_B$, and computation of S(t). Define test statistic S(t) by:

$$S(t)=\log\{[sup\ Pf(X_i,\theta):\theta\epsilon\omega_0]/[sup\ Pf(X_i,\theta):\theta\epsilon\omega_1]\} \quad \text{Equation 15}$$

Hence, for binary data, S(t) simplifies to:

$$S(t)=\Sigma\ \log(P_A)-\Sigma\ \log(P_B) \quad \text{Equation 16}$$

Finally, the original formulation for sequential procedures was intended for a single data type. Applying the method to a multi-source problem involves combining likelihoods from multiple sources. By representing these likelihoods in a common form (a likelihood conditioned on the state of the world), evidence can be combined across sources in a manner that supports the goals of the analysis.

B) Identifying the Best Next Information to Analyze

The disclosed approach is a novel methodology to increase confidence in an analyst's estimate of the state of the world. The best next source of data to collect is identified by combining a mutual information assessment—using a minimum-redundancy-maximum-relevance (mRMR) framework—with a cost-benefit analysis of the competing data sources under consideration. This capability supports both operational collection management use and what-if analysis for future situations and systems.

A redundant data type has high mutual information with data types that have already been incorporated into the analysis. A relevant source has high mutual information with the intelligence outcome, i.e. the state of the world that the analyst wants to estimate or predict. An optimized decision about which best next source to request is computed based on a source's value in terms of redundancy and relevance, and its cost of acquisition.

This concept of Mutual Information (MI) is central to identifying minimum redundancy and maximum relevance. The MI between two continuous random variables X and Y can be defined as the Kullback-Leibler divergence between the variables' joint density and the product of their independent densities (see Thomas M. Cover and Joy A. Thomas, *Elements of Information Theory*, Second Edition. Wiley-Interscience, 2006). This equation can be used to compute the redundancy between two potential data types under consideration, and also to compute the relevance between a data type and the intelligence outcome. An optimization is then performed to find the best next data type to request by, for example, using weighted combinations of the redundancy and relevance values computed from all sources under consideration.

$$MI(X,Y)=\int\int_{X,Y}p(x,y)\log\frac{p(x,y)}{p(x)p(y)}dxdy \quad \text{Equation 17}$$

The process for identifying the next data to request combines a mutual information assessment with a cost-benefit analysis of the competing sources under consideration. Intuitively, MI indicates the reduction in the uncertainty of one variable if the other is known and thus may be used to select sources for multi-INT analysis according to the minimal-redundancy-maximal-relevance (mRMR) criteria established by Peng et al. (see Hanchuan Peng, Fuhui Long, and Chris Ding. "Feature Selection Based on Mutual Information: Criteria of Max-Dependency, Max-Relevance, and Min-Redundancy." *IEEE Trans. PAMI* 27.8 (August 2005) 1226-1238). Relevance, defined as MI(F, C), the mutual information between source F and outcome C, is a measure of the utility of F for estimating or predicting the intelligence outcome of interest. Consider, however, two sources $F_1$ and $F_2$ such that $F_1=F_2$. If these features are highly relevant to the outcome C, it makes sense to select either one. Clearly, however, nothing is gained by selecting both, since nothing is learned from $F_2$ once $F_1$ is known (and vice-versa). Redundancy quantifies this observation according to $MI(F_1, F_2)$, the mutual information between the two sources $F_1$ and $F_2$. The mRMR criteria selects the data types for multi-INT analysis by maximizing relevance while minimizing redundancy between sources. It is also desirable to minimize the cost of obtaining source i. An appropriate heuristic is selected (e.g., a greedy algorithm) in which the next source is selected according to the weighted difference between these criteria, and extensions (e.g., Pablo A. Estevez et al. "Normalized Mutual Information Feature Selection." *IEEE Trans. Neural Networks* 20.2 (February 2009) 189-201) generally tune their relative scaling. Hence, the score for picking the next source then becomes $$mRMR=MI(F_i,C)-k_1{}^*\Sigma_j MI(F_i,F_j))-k_2{}^*\text{cost}_i, \quad \text{Equation 18}$$

where:
i is the index of the possible sources under consideration;
j are the indices of the sources already used;
$k_1$ is the relevance/redundancy tuning parameter;
$\text{cost}_i$ is the cost of collecting source i; and
$k_2$ is the weighting on the cost of collecting source i.

Maximizing mRMR over the possible sources yields the optimal score, where $k_1$ and $k_2$ are tuning parameters that controls the relative importance of relevance versus redundancy, and the weight of the cost of collecting source i respectively.

Figure 3:
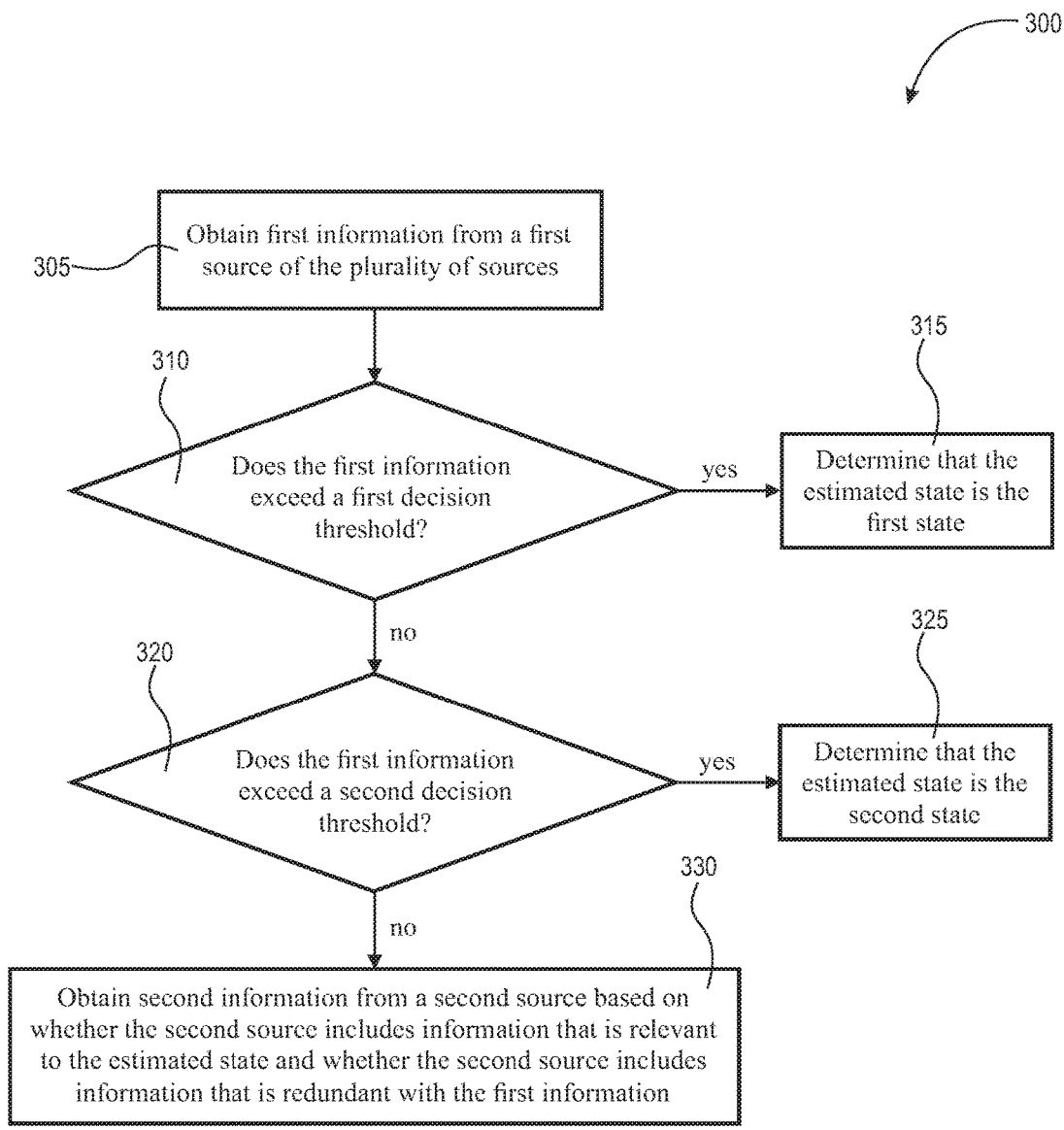
FIG. 3 is a flow chart illustrating obtaining and analyzing information to determine an estimated state of a real world, according to an example embodiment of the present invention.

FIG. 3 is a flow chart illustrating a method 300 of obtaining and analyzing information to determine an estimated state of a real world (e.g., a real-world physical environment), according to an example embodiment of the present invention. According to the method 300, a processor obtains 305 first information from a first source of a plurality of sources, where the first information is potentially indicative of first and second states of the real world. If the first information exceeds a first decision threshold 310, then the processor determines 315 that the estimated state is the first state, and if the first information exceeds a second decision threshold 320, then the processor determines 325 that the estimated state is the second state. If the first information does not exceed either of the first or second decision thresholds 310, 320, then the processor obtains 330 second information from a second source. In obtaining the second information, the processor determines whether the second source includes information that is relevant to the estimated state and whether the second source includes information that is redundant with the first information. The method can be incorporated into a real-world control system, for example, such as a control system for an industrial manufacturing system.

Figure 4:
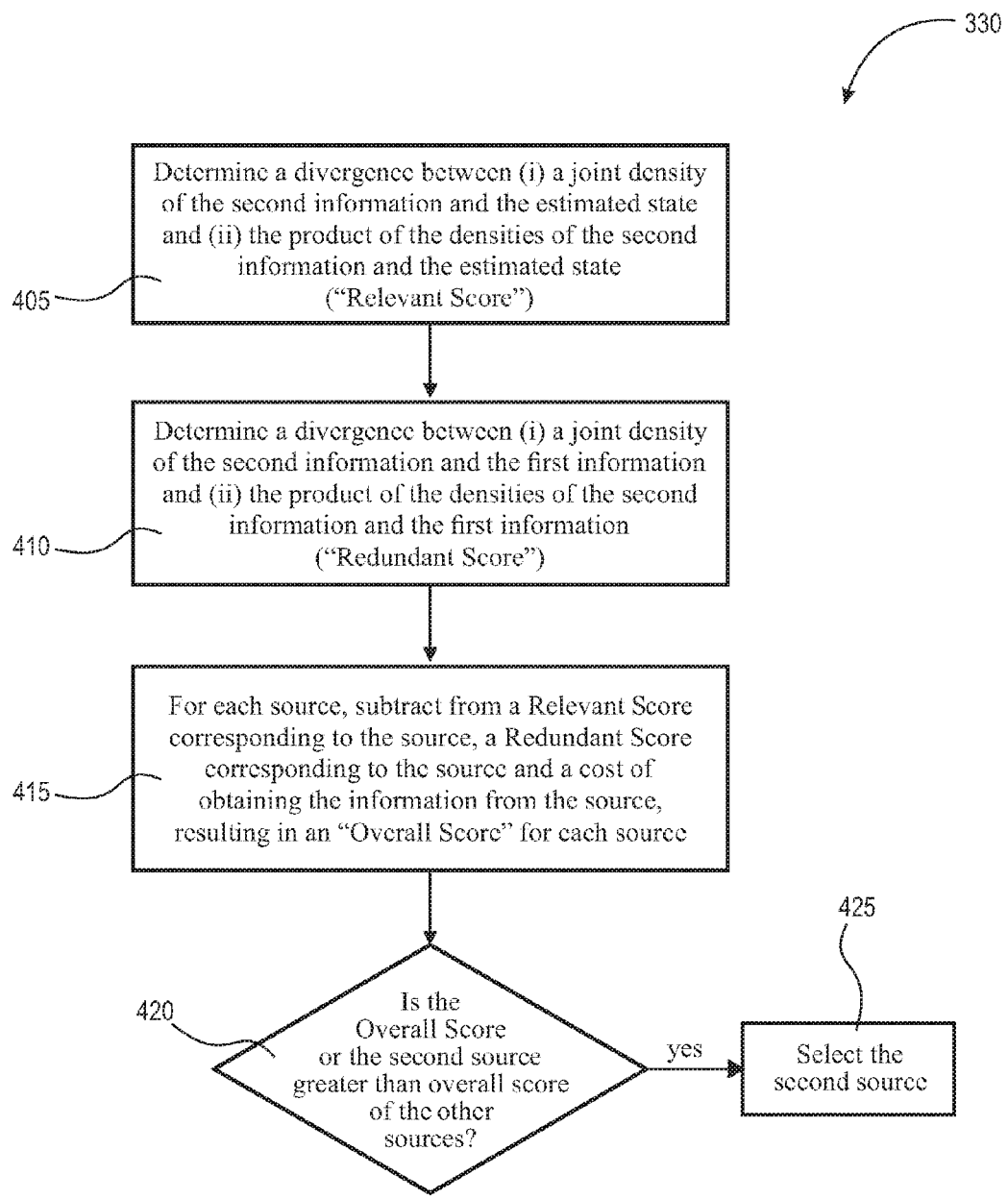
FIG. 4 is a flow chart illustrating obtaining second information from a second source, according to an example embodiment of the present invention.

FIG. 4 is a flow chart illustrating obtaining 330 second information from a second source, according to an example embodiment of the present invention. In the example embodiment, determining whether the second source includes information that is relevant to the estimated state includes determining 405 a "relevant score" by calculating a divergence between (i) a joint density of the second information and the estimated state and (ii) the product of the densities of the second information and the estimated state. Determining whether the second source includes information that is redundant to the estimated state includes determining 410 a "redundant score" by calculating a divergence between (i) a joint density of the second information and the first information and (ii) the product of the densities of the second information and the first information. It is then determined whether the second source includes information that is more relevant and less redundant than other sources of the plurality of sources by, for each source, subtracting from the relevant score corresponding to the source, the redundant score corresponding to the source and a cost of obtaining the information from the source, resulting in an overall score for each source 415. If the overall score for the second source is greater than each overall score of the other sources 420, then the second source is selected 425.

C) Example Problem

Figure 5:
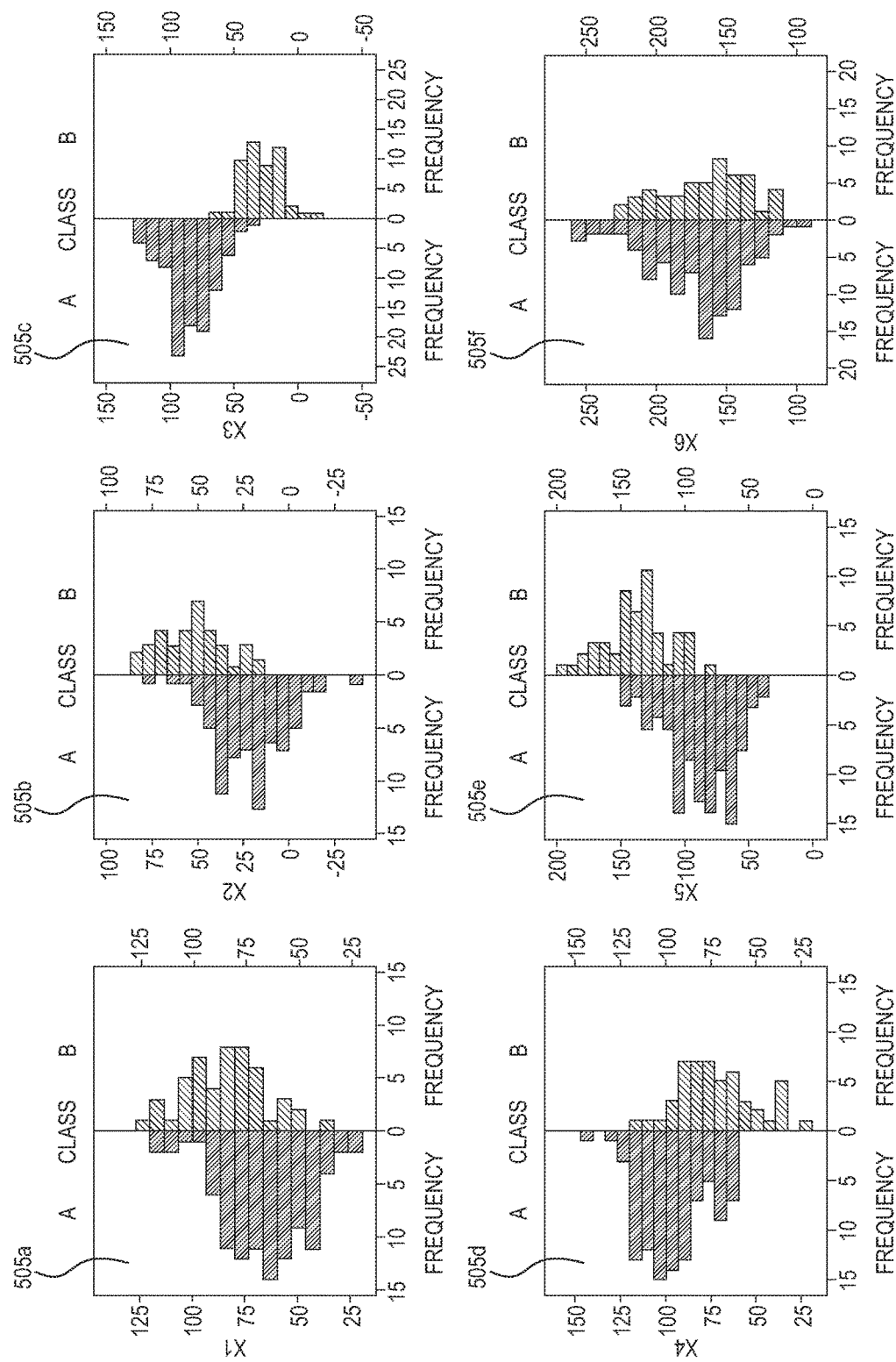
FIG. 5 is a series of histograms showing six data series representing six possible data types, according to an example problem that embodiments of the present invention are intended to solve.
Figure 6:
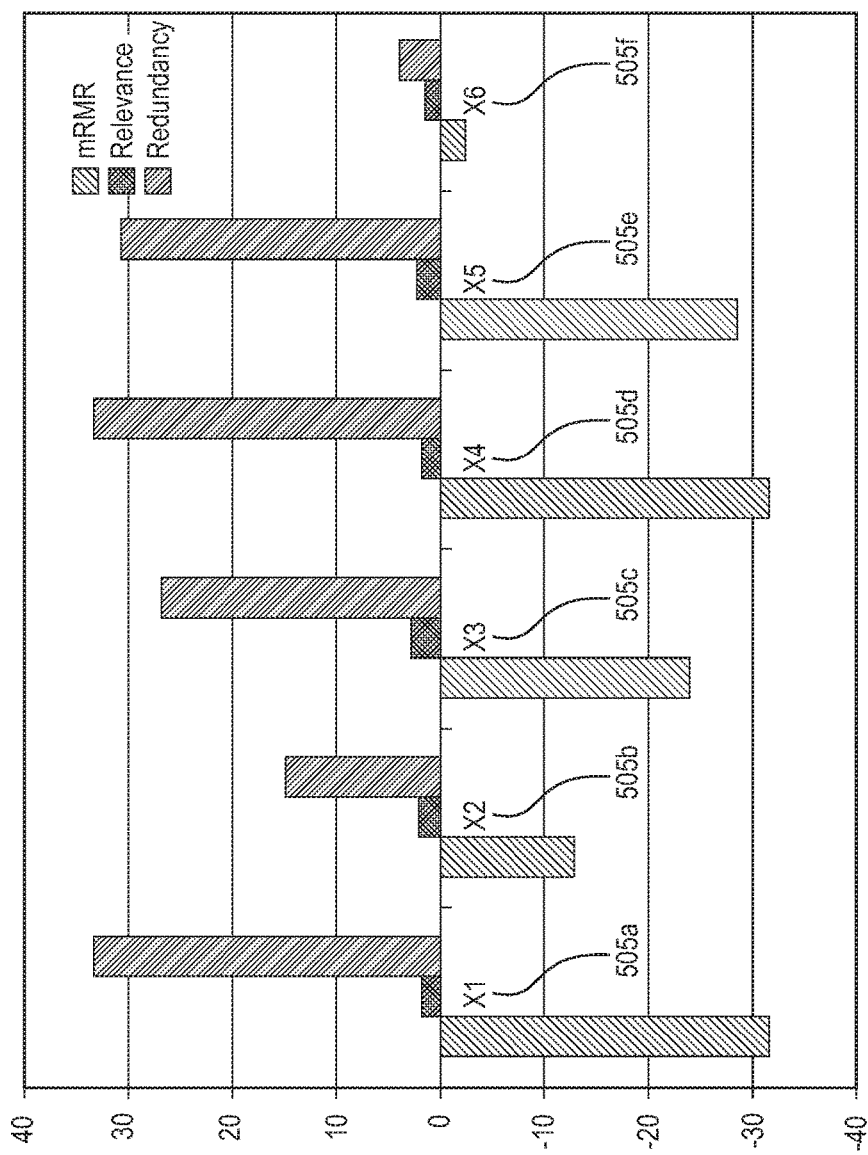
FIG. 6 is a chart illustrating mutual information values for relevance and redundancy for the six data series of FIG. 5.

With reference to FIG. 5, the following is a small numerical example that can be used to illustrate the process. In this example, six data series 505a-f have been generated that represent six possible data types. Each data series 505a-f provides information about two possible classes (i.e., states of the world). As shown in FIG. 5, the information from each variable is informative, but no one variable provides complete separability between A and B. The six variables exhibit a level of redundancy. Principle component analysis indicates that three components account for almost 90% of the variance, meaning that there is substantial overlap across the six variables. FIG. 6 illustrates mutual information values for relevance and redundancy for the six data series 505a-f of FIG. 5. Consider an initial set of 150 observations for training. In this example the data are Gaussian, so the training consists of computing estimates for the parameters of the distributions, i.e., the means and variances, used in the likelihood function and computing the mutual information values for relevance and redundancy.

Figure 7:
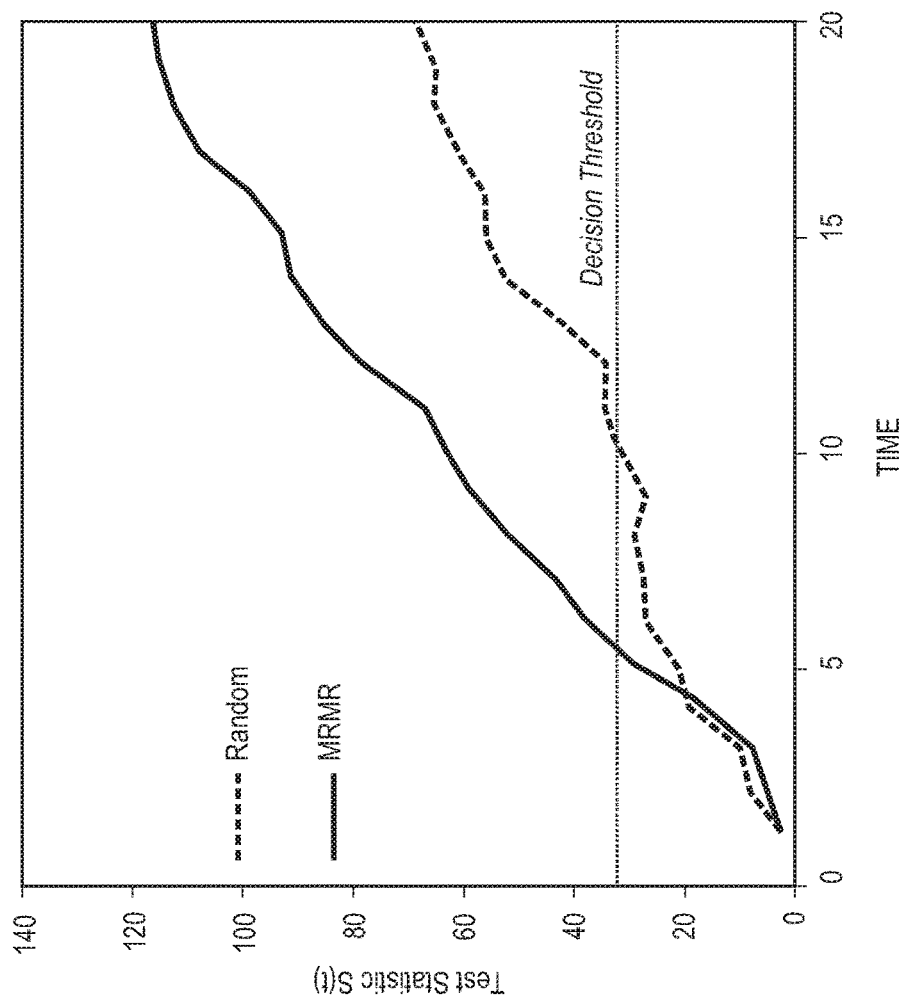
FIG. 7 is a graph illustrating the time difference in reaching a decision threshold using the disclosed minimal-redundancy-maximal-relevance approach as compared to a random approach.
Figure 8:
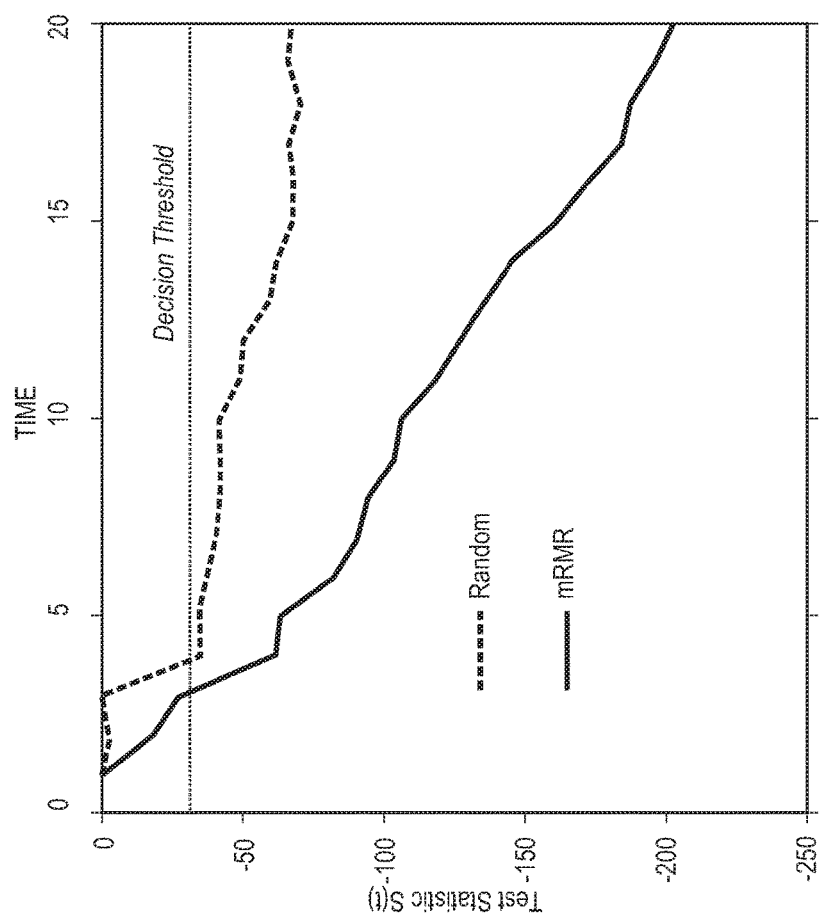
FIG. 8 is a graph illustrating the time difference in reaching a decision threshold using the disclosed minimal-redundancy-maximal-relevance approach as compared to a random approach.

To demonstrate the effect of leveraging mutual information for selecting the next data to include, compare this to a random selection of the sources. FIGS. 7 and 8 illustrate example applications of the process. Both methods lead to the correct decision about the state of the world. However, using mRMR leads to a decision several time steps earlier in both cases. FIG. 7 illustrates the time difference in reaching one decision threshold using the disclosed minimal-redundancy-maximal-relevance approach as compared to a random approach. FIG. 8 illustrates the time difference in reaching another decision threshold using the disclosed minimal-redundancy-maximal-relevance approach as compared to a random approach. For comparison, exploiting only a single source (just one of the six variables) will lead to a decision even later than the random combination of multiple sources. Thus, there is benefit to leveraging multiple sources, but the biggest improvement comes from exploiting the multiple variables optimally using mRMR.

Particular Application of the Process

An example ideal data set for demonstrating the utility of the disclosed closed-loop multi-INT data analytics and collection management system has at least three types of data related to a meaningful analysis problem. The key elements of the data set are: (1) the problem of interest involves making a decision or prediction related to two possible outcomes, (2) three or more different types of data are available, (3) sufficient descriptions of the data types and the problem exist to enable meaningful application of the analytic methods, and (4) training data is available for estimating mutual information or good descriptions to support "expert" judgments of probability distributions.

An example simulation of such an application is a Caribbean drug smuggling scenario with multiple data sources to illustrate the disclosed methods and systems. The following describes the notional scenario and all data generation details. This is a "simplified" scenario designed to have enough complexity to illustrate the approach.

Implementation of the Approach

For illustration of the approach, consider the following simplified version of a Caribbean drug trafficking analysis involving multiple sources of data generated through a simulation. The goal of the simulation is to use the multiple data sources to infer whether a specific ship is or is not a drug smuggler. Computation using a set of training data accomplishes the two objectives needed to apply the disclosed methods and systems: (1) For each data type, the training data are used to train a classifier, which produces a probability that the ship is a drug smuggler or not, and (2) the estimated probabilities for each data type are then used to compute the mutual information values, which are used to estimate mRMR. Once the training process is completed, the method can be tested on new data.

Figure 9:
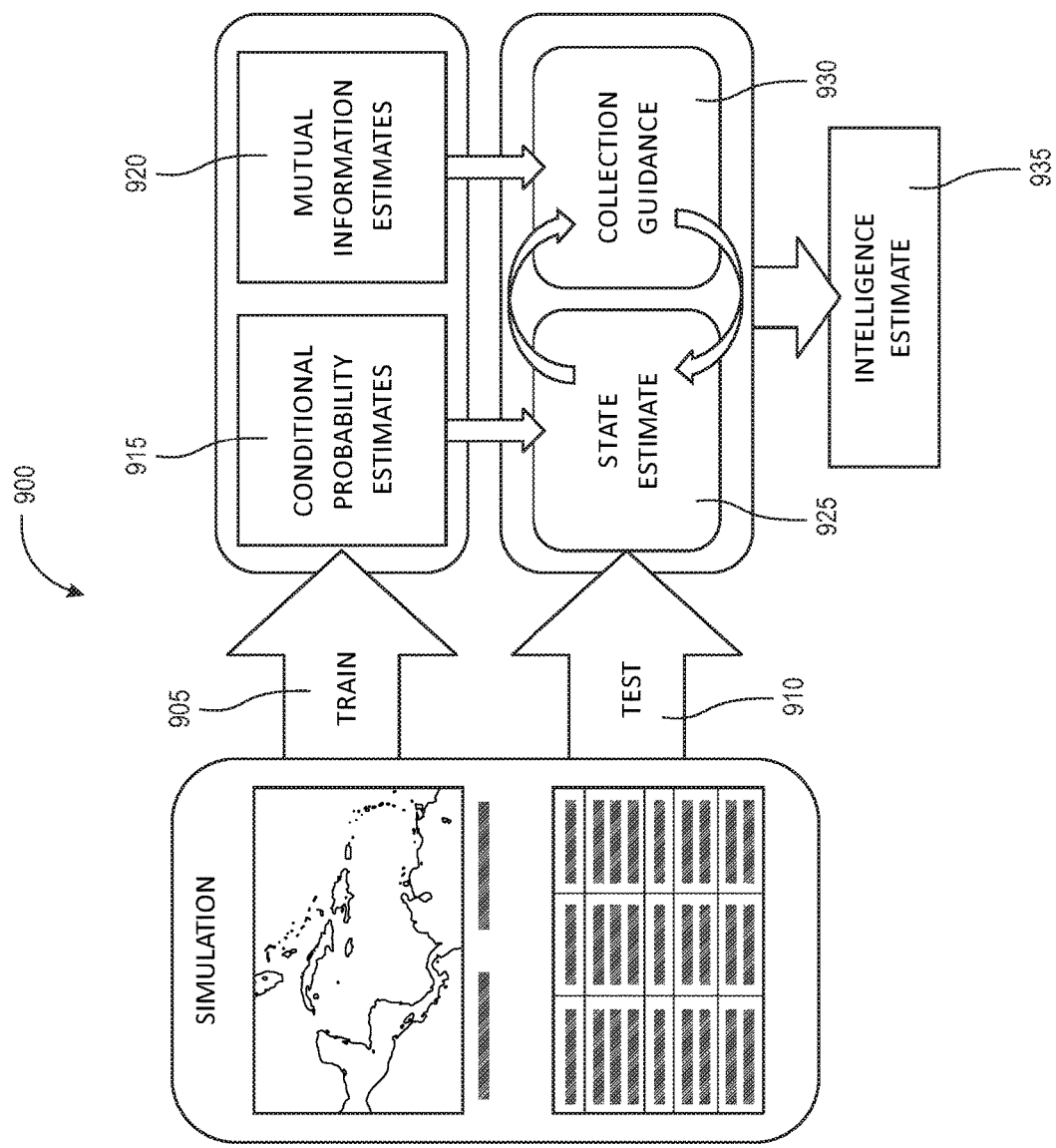
FIG. 9 is a flow chart illustrating an example application of an embodiment of the present invention in the context of drug trafficking analysis.

An overall approach 900 of training and testing is depicted in FIG. 9. According to the particular simulation 900, a set of training data is created 905 from which conditional probably estimates 915 and mutual information estimates 920 are calculated. An independent set of testing data is created 910 for the simulation 900. Using the testing data, the system estimates the state 925 of each ship (whether it is a drug smuggler) and collects 930 additional information when necessary, according to the methods disclosed herein. The simulation ends with an estimate 935 of the states of the ships.

Simulation Overview

The goal of drug traffickers is to get drugs from source locations (e.g., Colombia, Mexico, and Jamaica) to the USA (e.g., Miami or the unloading point near Tampa). Drug smuggling ships try to "blend in" and mold their operations around commercial cargo routes as much as possible. Drugs can be loaded onto ships, unloaded from ships, or transferred between ships at a transshipment point, port, or loiter at sea location.

The goal of the data analytics is to assess each vessel and assign it to one of two categories: benign or drug smuggler. Under consideration is whether the evidence about the route of the ship, ports visited, and any loiter-at-sea activity is benign or abnormal for the type of ship being observed.

Four types of vessels are included in the simulation: fishing vessels, merchant ships, cruise ships, and semi-submersibles. A semi-submersible is always a drug smuggler. For the other three ship types, only a small percentage of each are drug smugglers and display small abnormalities in behavior. Such abnormalities can be inferred from sensor data.

Benign merchant vessels transit directly from one port to another. This is true also for a merchant vessel that is a drug smuggler, but one port on the route is identified as a possible transshipment point.

Benign cruise ships have a sense of 'home port'. Their route takes them from a port to some combination of stops at other ports, and eventually back to port of origin. They do not loiter at sea. A cruise ship that is a drug smuggler follows a similar route, but also includes a loiter-at-sea activity.

Benign fishing vessels have a sense of 'home port'. Their route departs from a port, loiters at one or more locations while at sea, and then returns to the port of origin. No other ports are visited. A fishing vessel that is a drug smuggler has as one end of its route a port different than the port of origin.

Semi-submersibles are always drug smugglers. They follow a route that takes them to multiple ports all identified as possible transshipment points.

Four types of sensor data are simulated: AIS, GMTI, Cell Phone hits, and Imagers.

Automatic Identification System (AIS) transponders report ship ID, location, bearing, speed and type, all of which is recorded into an AIS database. The cruise and merchant ships, including drug smugglers of these types, report this information whenever they are not in port. The fishing vessels report whenever they are out of port, with the exception that they do not report when they are loitering at sea. Whether or not a fishing vessel carries and AIS transponder is user-assigned.

All vessels located in a GMTI sensor area are 'visible' to the sensor. GMTI reports a location and bearing. It does not report ship type nor ship ID. The GMTI sensor area is a fixed box with user-assigned latitude and longitude boundaries.

All drug smuggling vessels have a user-assigned probability of generating a cell phone 'hit' each simulation time interval. The Cell Phone Call database reports a location and caller ID. The caller ID is uniquely associated with a ship ID.

All vessels located in an Imagery sensor area are 'visible' to the sensor if the sensor is tasked at that time. A high resolution sensor reports ship location, bearing and ship type. A low resolution sensor reports position and bearing, but not ship type. An imager has several user-assigned parameters: footprint size in degrees of latitude and longitude about a boresight, time-of-day start and stop times for tasking, time interval between changes in boresight locations, and the default boresight locations over time (a priori tasking).

Each vessel is assigned a route and a user-selected nominal speed. Each route is a list of waypoints giving locations of ports, shipping lane turn points, probable transshipment ports, and loiter at sea locations. The data generator will expand this set of waypoints based on speed and simulation time step interval such that there is a point for each time step interval, with intermediate points defined by a great circle path. Each path segment (waypoint to waypoint) must include at least one intermediate point and also an integer number of intermediate points. The distance between pairs of intermediate points will be traversed during a simulation time interval, and thus may not exactly correspond to the nominal speed assigned to a vessel.

Behavior of the vessel when it reaches each waypoint is dependent on the waypoint type. For shipping lane turn points the vessel proceeds along the new route segment. For port, transshipment port or loiter at sea waypoints a vessel will stop, and will remain at the waypoint for a random amount of time. The threshold of a uniform distribution is user-selectable, to control the likelihood of remaining stopped. As time progresses the vessel will randomly either proceed along the route or reverse direction and proceed back along the way it came.

Figure 10:
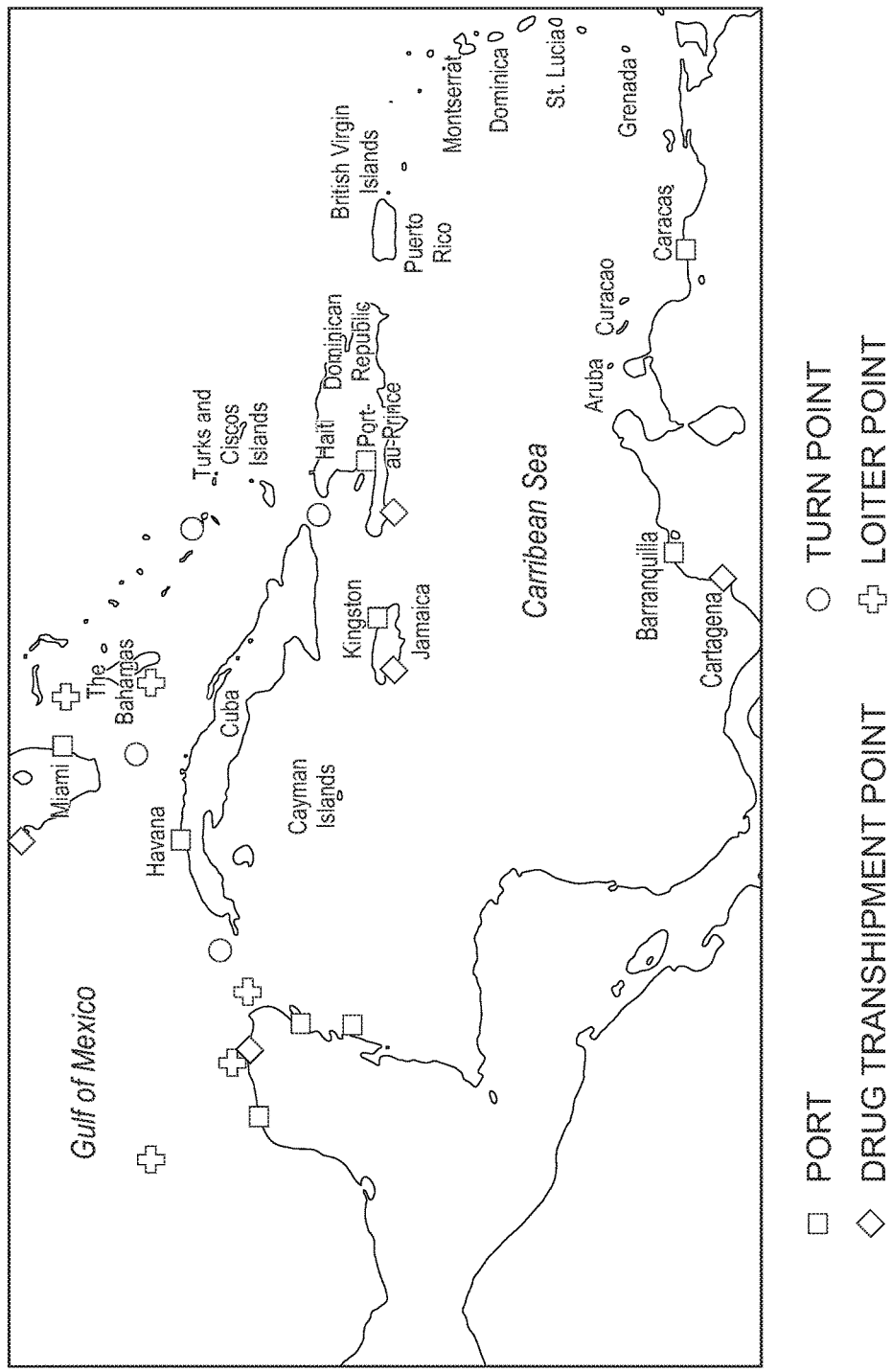
FIG. 10 is a map illustrating example data (e.g., waypoints and ports) used in the example drug trafficking analysis.
Figure 11:
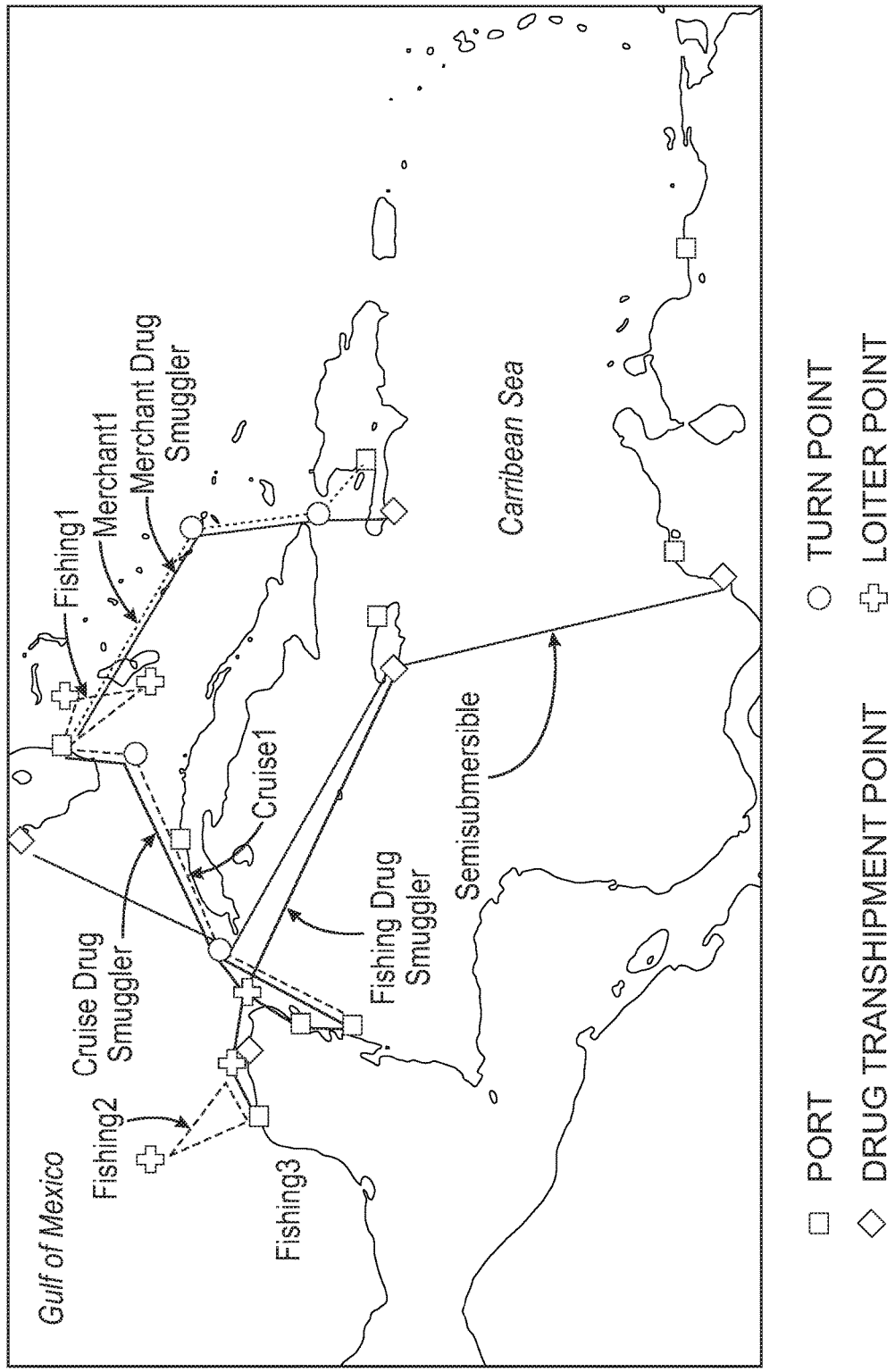
FIG. 11 is a map illustrating more example data (e.g., routes) used in the example drug trafficking analysis.

Waypoints (Table 1) and routes (Table 2) used to simulate vessel movements for the training and testing data are listed below. FIG. 10 shows these waypoints on the map, and FIG. 11 shows the different routes.

TABLE 1

Waypoints for the data generation scenario

| WPT# | Latitude | Longitude | Name | Type |
|---|---|---|---|---|
| 1 | 9.6 | −79.3 | PanamaCanal | 1 (Port) |
| 2 | 29.4 | −94.8 | Houston | 1 |
| 3 | 25.78 | −80.20 | Miami | 1 |
| 4 | 18.42 | −77.09 | OchoRios | 1 |
| 5 | 18.67 | −72.38 | PortAuPrince | 1 |
| 6 | 23.16 | −82.38 | Havana | 1 |
| 7 | 19.34 | −87.60 | QuintanaRoo | 1 |
| 8 | 21.30 | −89.73 | Merida | 1 |
| 9 | 20.63 | −87.06 | Cancun | 1 |
| 10 | 11.09 | −74.87 | Barranquilla | 1 |
| 11 | 10.67 | −66.96 | Caracas | 1 |
| 12 | 20.1 | −73.7 | WPCubaE | 2 (Turn) |
| 13 | 23.5 | −74.2 | WP4Miami | 2 |
| 14 | 22.1 | −85.8 | WPCubaW | 2 |
| 15 | 24.5 | −80.2 | WPKeyWest | 2 |
| 16 | 28.05 | −82.79 | TransShipFla | 3 (Transship) |
| 17 | 21.64 | −88.22 | TransShipMex | 3 |
| 18 | 9.62 | −75.60 | TransShipCol | 3 |
| 19 | 18.01 | −77.84 | TransShipJam | 3 |
| 20 | 18.19 | −73.76 | TransShipHti | 3 |
| 21 | 24.00 | −91.58 | LoiterGulfW | 4 (loiter at sea) |
| 22 | 22.06 | −88.29 | LoiterYucatan | 4 |
| 23 | 21.66 | −86.48 | LoiterCancun | 4 |
| 24 | 25.80 | −78.53 | LoiterMiami | 4 |
| 25 | 23.85 | −78.35 | LoiterBahama | 4 |

In FIG. 10, squares indicate the benign ports (waypoint type 1), circles indicate shipping route turn waypoints (waypoint type 2), diamonds indicate probable drug transshipment ports (waypoint type 3), and crosses indicate loiter-at-sea locations (waypoint type 4).

TABLE 2

Routes used in the data generation scenario

| Route name | Waypoint list | Description | Nominal speed |
|---|---|---|---|
| Fishing1 | 3, 24, 25, 3 | Miami fishing trip, two loiters | 15 kt |
| Fishing2 | 8, 21, 22, 8 | Merida fishing trip, two loiters | 15 kt |
| Fishing3 | 8, 23, 8 | Merida fishing trip, one loiter | 15 kt |
| FishingDS | 8, 22, 23, 19 | Merida fishing trip, two loiters, end point is transshipment instead of home port | 15 kt |
| Merchant1 | 3, 13, 12, 5 | Miami-PortAuPrince, no loiters | 12 kt |
| MerchantDS | 3, 13, 12, 20 | Miami-Transship Haiti, no loiters | 12 kt |
| Passenger1 | 3, 15, 14, 9, 7, 14, 15, 3 | Cruise Miami-Cancun-QuintanaRoo, no loiters | 17 kt |
| PassengerDS | 3, 15, 14, 23, 9, 7, 14, 15, 3 | Cruise Miami-Cancun-QuintanaRoo, one loiters | 17 kt |
| SemisubDS | 18, 19, 14, 16 | Semisubmersible, three transshipment points Columbia-Jamaica-Florida | 10 kt |

Training Data

Figure 12:
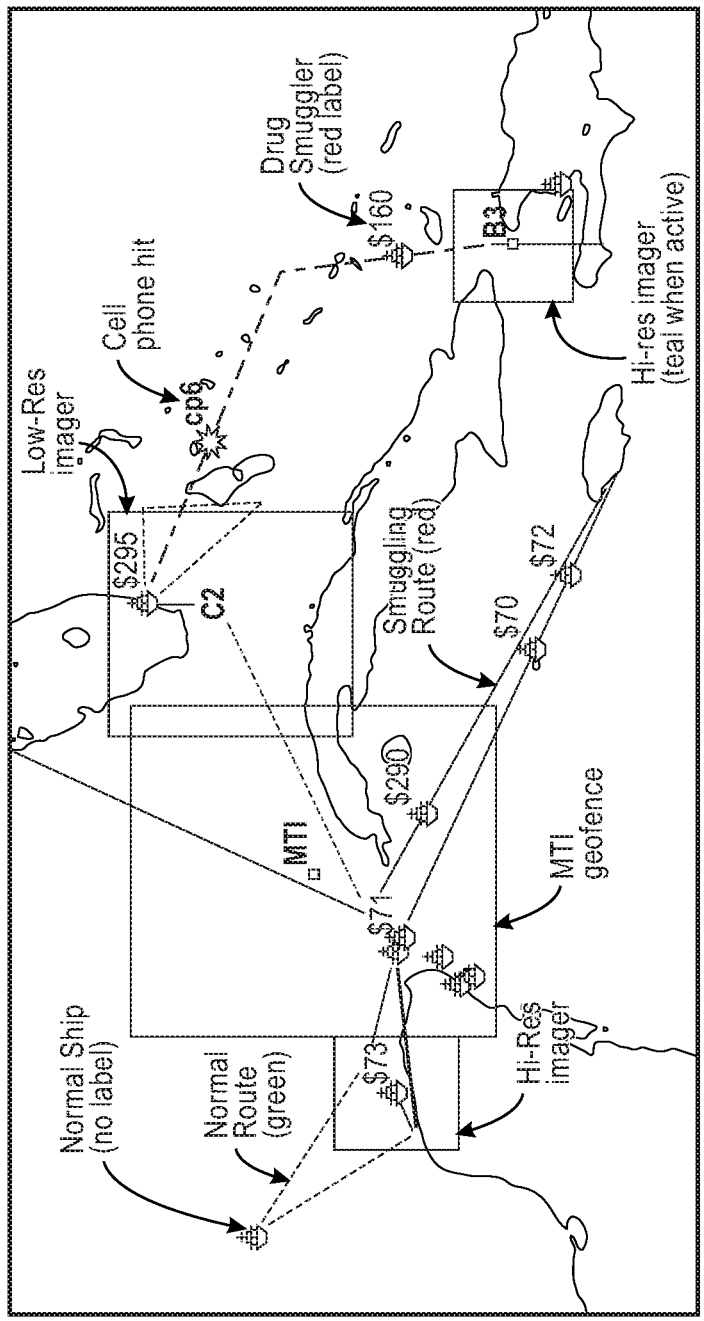
FIG. 12 is a map illustrating more example data (e.g., sensor footprints and ship locations) used in the example drug trafficking analysis.

A set of training data was created with the following vessel populations (Table 3), sensor definitions (Table 4) and associated sensor records. This training data includes a significant percentage of drug smuggling vessels for the training of the classifiers. Whether a vessel is included in a sensor data file will depend on the user-assigned route compared to the user-assigned sensor coverage area. A sensor is listed as applicable to a vessel if it is possible to include the vessel based on geometric overlap of the sensor footprint and the vessel track. FIG. 12 shows example sensor footprints and ship locations that can be used in the simulation.

The simulation begins in steady state, with every vessel existing at some location. Each vessel is assigned a random intermediate point along its route as a time zero point, and is assigned a random direction to proceed along the route. It is possible for a vessel to remain in port for an entire simulation period depending on user-adjusted parameters, but nonetheless a truth file will be generated accounting for every vessel at every time interval.

Providing training data for taskable sensors needs some consideration. For this training set, each taskable sensor is assigned a time-varying set of boresights along a suspected drug smuggling route. This does not guarantee, but increases the likelihood, that the training data from these sensors will include sufficient sampling of both benign and drug smuggling vessels.

TABLE 3

Vessel population and routes for the training data set

| Ship ID (489 ships total) | Route (DS indicates drug smuggler behavior) | Applicable Sensors |
|---|---|---|
| 1-31 | Fishing1 (carries AIS transponder) | AIS, IMB, IMC |
| 32-52 | Fishing2 | MTI, IMA, IMC |
| 53-70 | Fishing3 | MTI, IMA, IMC |
| 71-130 | FishingDS | MTI, CPhone, IMA, IMC |
| 131-214 | Merchant1 (carries AIS transponder) | AIS, IMB, IMC |
| 215-274 | MerchantDS (carries AIS transponder) | AIS, CPhone, IMB, IMC |
| 275-400 | Passenger1 (carries AIS transponder) | AIS, MTI, IMA, IMB, IMC |
| 401-460 | PassengerDS (carries AIS transponder) | AIS, MTI, CPhone, IMA, IMB, IMC |
| 461-489 | SemisubDS | MTI, CPhone, IMA, IMB, IMC |

Testing Data

An independent set of testing data was created with the following vessel populations (Table 5). The sensor definitions are as defined for the training set (Table 4) but the associated sensor records are dependent on the new vessel populations and associated truth activities. This testing data includes a more realistic (i.e., greatly reduced) percentage of drug smuggling vessels. Whether a vessel is included in a sensor data file will depend on the user-assigned route compared to the user-assigned sensor coverage area. A sensor is listed as applicable to a vessel if it is possible to include the vessel based on geometric overlap of the sensor footprint and the vessel track.

As with the training data, the simulation begins in steady state, with every vessel existing at some location. Each vessel is assigned a random intermediate point along its route as a time zero location, and is assigned a random direction to proceed along the route. It is possible for a vessel to remain in port for an entire simulation period depending on user-adjusted parameters, but nonetheless a truth file will be generated accounting for every vessel at every time interval.

During testing, the collection tasking functionality is modeled for the taskable sensors. For this scenario, it is assumed that each taskable sensor can be available to report with a delay of one time interval, and will report all vessels included within the footprint around a given boresight for a boresight interval. It is possible to increase the real world fidelity and restrict the boresight options based on sensor platform trajectories, orbits, or existing tasking priorities. Such restrictions are defined for real-world sensors, but were considered outside the scope of this data simulation effort.

TABLE 4

Sensor parameters and descriptions for the training data set

| Sensor | Description and User-Assigned Parameters |
|---|---|
| AIS | For each simulation time interval the AIS record includes all vessels assigned AIS transponders when they are underway, and cruise and merchant vessels during loiter at sea. |
| MTI | For each simulation time interval, the MTI record includes all vessels that are inside a geofence defined by 26.0° N, 20.0° S, −88.0° W, 82.0° E |
| CPhone | The Cell Phone record includes only those times for which a drug smuggling vessel is simulated to have a cell phone call. |
| IMA | The IMA high resolution imager record includes all vessels that are inside a geofence defined by +− 2° around a boresight. Boresights are randomly selected from the FishingDS route. The sensor collects only between 6 AM and 6 PM inclusive. The boresight is reassigned every 4 hours starting at midnight. |
| IMB | The IMB high resolution imager record includes all vessels that are inside a geofence defined by +− 2° around a boresight. Boresights are randomly selected from the MerchantDS route. |

TABLE 4-continued

Sensor parameters and descriptions for the training data set

| Sensor | Description and User-Assigned Parameters |
|---|---|
| | The sensor collects at all times (day/night). The boresight is reassigned every 4 hours starting at midnight. |
| 215-274 | The IMC low resolution imager record includes all vessels that are inside a geofence defined by +− 4° around a boresight. Boresights are randomly selected from the PassengerDS route. The sensor collects only between 6 AM and 6 PM inclusive. The boresight is reassigned every 6 hours starting at midnight. |

There is a possibility that a vessel, whether drug smuggler or benign, will not be sampled by the sparse set of sensors simulated in this scenario. This could be addressed in the collection tasking, if the tasking requests were expanded to include tasking to sample currently under-sampled geographic areas rather than just tasking for additional knowledge about known vessels. This would allow tasking for unknown-knowns (undetected vessels of known type).

The AIS, MTI and Cell Phone sensors are set as for the training data. Imager field-of-view and boresight duration parameters are set as for training data, but the boresight is assigned through the collection tasking based on the estimated location of the vessel of interest.

Test Scenario and Results

A test scenario aimed at mirroring an operational situation was created. A set of test data were created that contained all ship types. The data included 21 smuggler ships and 90 normal ships over six days. The data were analyzed in 4-hour streaming chunks, to simulate a real-time situation.

TABLE 5

Vessel population and routes for the testing data set

| Ship ID (300 ships total) | Route (DS indicates drug smuggler behavior) | Applicable Sensors |
|---|---|---|
| 1-31 | Fishing1 (carries AIS transponder) | AIS, IMA, IMB, IMC |
| 32-52 | Fishing2 | MTI, IMA, IMB, IMC |
| 53-70 | Fishing3 | MTI, IMA, IMB, IMC |
| 71-76 | FishingDS | MTI, CPhone, IMA, IMB, IMC |
| 77-160 | Merchant1 (carries AIS transponder) | AIS, IMA, IMB, IMC |
| 161-166 | MerchantDS (carries AIS transponder) | AIS, CPhone, IMA, IMB, IMC |
| 167-292 | Passenger1 (carries AIS transponder) | AIS, MTI, IMA, IMB, IMC |
| 293-298 | PassengerDS (carries AIS transponder) | AIS, MTI, CPhone, IMA, IMB, IMC |
| 299-300 | SemisubDS | MTI, CPhone, IMA, IMB, IMC |

The test data were processed using two different methods. For both methods it was assumed that an analyst had identified a ship from MTI data, when available. AIS data is used for ships with no MTI data. Ships that did not have AIS, and did not appear in the MTI image at a given time, were considered unidentified for that time block.

Figure 13:
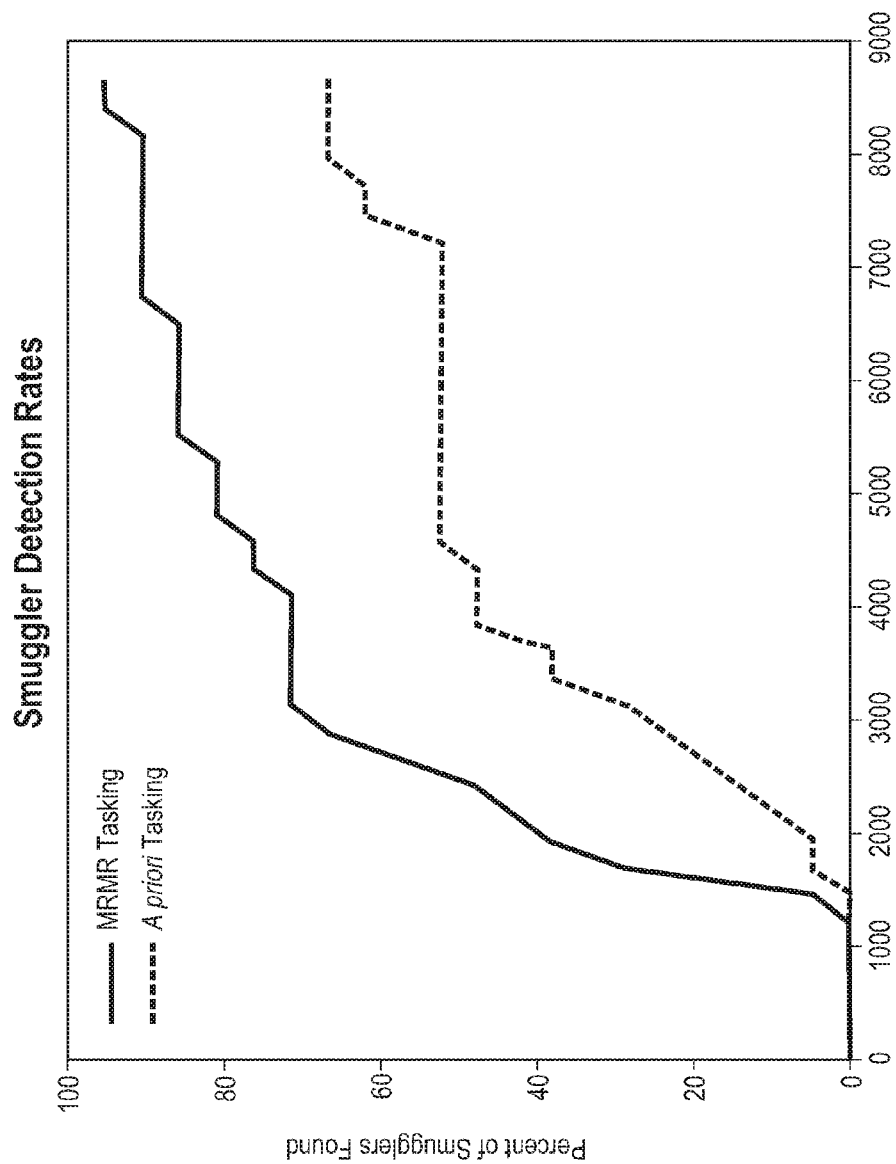
FIG. 13 is a graph illustrating the time difference in identifying drug traffickers using the disclosed minimal-redundancy-maximal-relevance approach as compared to an a priori approach.

In the first method (a priori Tasking), an attempt was made to classify the ships by randomly selecting, at each tine step, one of the three imagers from which to obtain follow-up observations. In the second method (mRMR Tasking), an attempt was made to classify the ships using the mRMR methodology to select which imager to task. FIG. 13 illustrates results for the two test scenarios. From the analysis, 67% of the smuggler ships (14/21) were identified by the end of day six using the a priori tasking methodology. On the other hand, 95% of the smuggler ships (20/21) were identified by the end of day six using the mRMR methodology, with 67% (14/21) ships identified after only two days of observations. Thus, the mRMR methodology is found to yield a substantial improvement both in smuggler detection potential and in time to detection.

The above example scenario involves an application of the disclosed methods and systems for detecting drug traffickers. The disclosed methods and systems, however, may be applied in other scenarios to achieve superior performance. The following are examples of other such scenarios, in each case the goal is to make a decision and multiple sources of information are available to inform the decision.

Monitoring a Power Grid—The power grid for a city or region is a complex system. Health of the system depends on balancing the generation of electrical power with the demand from customers and the capacity of the components in the system. One important ongoing decision in such a scenario is to answer the question: "Is the power grid in a healthy state?" If the answer is "no" then operators can take steps to identify and correct problems. Various types of information may be relevant to this decision process. For example, ongoing monitoring of the power on the major distribution lines can be first indicator of system status. If the power level fluctuates too far, seeking out additional information could clarify the situation. Is the problem due to a drop in production, an increase in demand, or a failure at a sub-station or transformer? The embodiments of the present invention provide a mathematical-based approach to systematically query data sources (e.g., meters at various points in the grid, temperature sensors on turbines, weather data, etc.) to reach an accurate decision about the health of the system in minimal time. Such a system could be implemented as a fully automated system for generating alerts.

Patient Monitoring in a Neural Intensive Care Unit—In a neural intensive care unit (NICU), patients with serious medical conditions are typically connected to a large number of medical devices to monitor various conditions: heart rate, blood pressure, respiration, blood oxygen, intracranial pressure, etc. Many of the devices include settings for alarms and an alarm sounds when one of these signals wanders outside pre-defined ranges. Unfortunately, individual fluctuations in patient state are common and these alarms will sound frequently, even when the patient is in an acceptable state. From a patient care standpoint, the real question is: "Has the patient's medical state changed to a degree that intervention is necessary?" A system that considers the suite of available data sources, including the signals from monitoring devices, lab results from various tests, and information about the patient history, could provide a much more informed decision. The embodiments of the present invention provide methods and systems for querying and combining the various signals and data sources to provide an accurate and timely decision about the state of the patient.

Early Warning of Disease Outbreak—A number of studies have proposed methods for early detection of outbreaks of a disease. Analysis of Google searches can indicate an increase in searches related to particular symptoms. Another recent study looked at parking lots at hospitals and clinics to detect increases in attendance. Other indicators include changes in commuter patterns or school attendance, purchases of over-the-counter remedies at local stores, and chatter in social media. Which of these sources, alone or in combination, provide the best accurate early indication of an outbreak? The embodiments of the present invention provide the approach for combining the best set of available information to yield an early and reliable decision.

Digital Processing Environment

Figure 14:
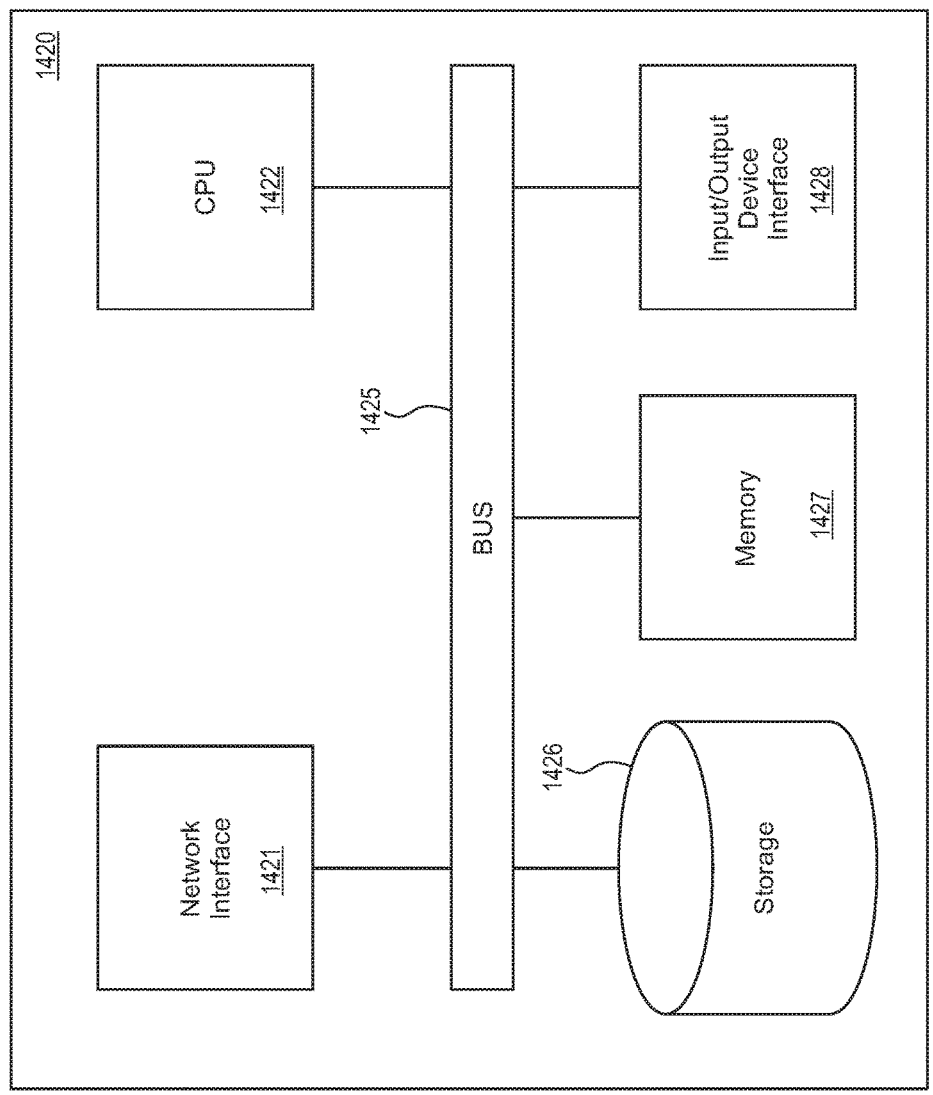
FIG. 14 is a block diagram of a computer (or digital processing) system for obtaining and analyzing information to determine an estimated state of a real world, according to an example embodiment of the present invention.

FIG. 14 is a simplified block diagram of a computer-based system 1420 that may be used for obtaining and analyzing information to determine an estimated state of a real world, according to an example embodiment of the present invention. The system 1420 comprises a bus 1425. The bus 1425 serves as an interconnector between the various components of the system 1420. Connected to the bus 1425 is an input/output device interface 1428 for connecting various input and output devices such as a keyboard, mouse, display, touch screen overlay, speakers, camera, sensor feeds, controllers, etc. to the system 1420, and for outputting the determined state by, for example, raising an alert, notification, other visual display (e.g., highlighting certain text on a display), or audio output that indicates the determined state, sounding an alarm, or sending an e-mail, voice message, or text message. The output can also be fed into other system components, such as control or alarm systems, or may be reported to one or more system users. A central processing unit (CPU) 1422 is connected to the bus 1425 and provides for the execution of computer instructions. Memory 1427 provides volatile storage for data used for carrying out computer instructions. Storage 1426 provides non-volatile storage for software instructions, such as an operating system (not shown). In particular, memory 1427 and/or storage 1426 are configured with program instructions implementing methods and/or modules 100, 300, and 900 for obtaining and analyzing information to determine an estimated state of a real world, as detailed in FIGS. 1-4 and 9. The system 1420 also comprises a network interface 1421 for connecting to any variety of networks known in the art, including cloud, wide area networks (WANs), and local area networks (LANs), or for feeding the state determination to other system components via a network.

It should be understood that the example embodiments described herein may be implemented in many different ways. In some instances, the various methods, systems, and devices described herein may each be implemented by a physical, virtual, or hybrid general purpose computer. The computer system 1420 may be transformed into the machines that execute the methods described herein, for example, by loading software instructions into either memory 1427 or non-volatile storage 1426 for execution by the CPU 1422.

Figure 15:
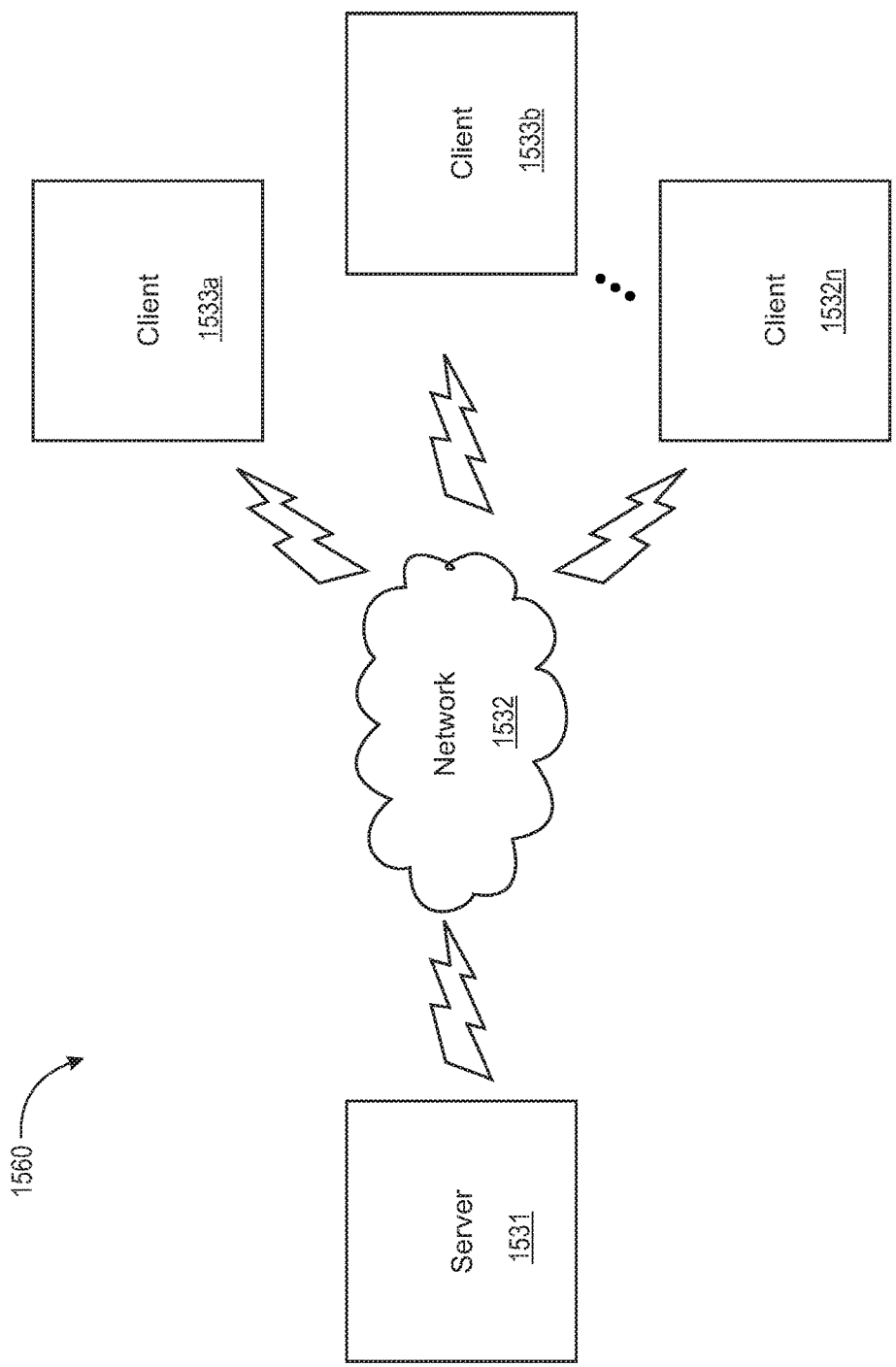
FIG. 15 is a schematic diagram of an example computer network environment in which embodiments of the present invention may be implemented.

FIG. 15 illustrates a computer network environment 1560 in which an embodiment of the present invention may be implemented. In the computer network environment 1560, a server 1531 is linked through a communications network 1532 to clients 1533a-n. The environment 1560 may be used to allow the clients 1533a-n, alone or in combination with the server 1531 to execute any of the methods and/or modules 100, 300, and 900 for obtaining and analyzing information to determine an estimated state of a real world, as detailed in FIGS. 1-4 and 9. It should be understood that the example embodiments described above may be implemented in many different ways. In some instances, the various methods and machines described herein may each be implemented by a physical, virtual, or hybrid general purpose computer, or a computer network environment such as the computer environment 1560.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of obtaining and analyzing information to determine an estimated state of a real world, the method comprising:

obtaining, by a processor in communication with a plurality of sources, first information from a first source of the plurality of sources, the first information being potentially indicative of a first state of the real world and a second state of the real world;

determining, by the processor, that the estimated state is the first state if the first information exceeds a first decision threshold;

determining, by the processor, that the estimated state is the second state if the first information exceeds a second decision threshold;

obtaining, by the processor, second information from a second source of the plurality of sources if the first information does not exceed the first decision threshold and does not exceed the second decision threshold, the obtaining of the second information including:

determining, by the processor, whether the second source includes information that is relevant to the estimated state based on a divergence between (i) a joint density of the second information and the estimated state and (ii) the product of the densities of the second information and the estimated state, the determined divergence resulting in a relevant score;

determining, by the processor, whether the second source includes information that is redundant with the first information based on a divergence between (i) a joint density of the second information and the first information and (ii) the product of the densities of the second information and the first information, the determined divergence resulting in a redundant score; and determining, by the processor, whether the second source includes information that is more relevant and less redundant than other sources of the plurality of sources by (i) for each source, subtracting from the relevant score corresponding to the source, the redundant score corresponding to the source and a cost of obtaining the information from the source, resulting in an overall score for each source, and (ii) selecting the second source if the overall score for the second source is greater than each overall score of the other sources of the plurality of sources;

determining, by the processor, whether the estimated state is the first state or the second state based on whether the first information and the second information together exceeds the first decision threshold or the second decision threshold, improving performance of the processor by reducing time consumed for determining whether the estimated state is the first state or the second state; and generating a notification based on the estimated state determination.

2. A method as in claim 1 wherein determining whether the second source includes information that is more relevant and less redundant than the other sources includes weighting the redundant scores and the costs of obtaining the information.

3. A method as in claim 1 wherein the plurality of sources include any of a data store, a real-time data stream, and a service from which information can be requested.

4. A method as in claim 1 wherein:
the real world includes a plurality of ships traveling in a body of water;
the estimated state is whether a particular ship of the plurality of ships is a drug smuggler;
the first state is that the ship is a drug smuggler;
the second state is that the ship is not a drug smuggler;
the first information includes information regarding the type of the particular ship; and
the second information includes information regarding the route of the particular ship.

5. A method as in claim 1 wherein the first source and the second source are physical sources and include any of a temperature sensor, electric meter, and physiological monitor.

6. A system for obtaining and analyzing information to determine an estimated state of a real world, the system comprising:
a plurality of sources including any of a data store, a real-time data stream, and a service from which information can be requested, the plurality of sources including (i) a first source including first information potentially indicative of a first state of the real world and a second state of the real world and (ii) a second source including second information potentially indicative of the first state and the second state;
an interface in communication with the plurality of sources and configured to obtain information from the plurality of sources; and
a processor in communication with the interface and configured to:
determine that the estimated state is the first state if the first information exceeds a first decision threshold;
determine that the estimated state is the second state if the first information exceeds a second decision threshold;
obtain the second information from the second source if the first information does not exceed the first decision threshold and does not exceed the second decision threshold, the processor obtaining the second information by:
determining whether the second source includes information that is relevant to the estimated state based on a divergence between (i) a joint density of the second information and the estimated state and (ii) the product of the densities of the second information and the estimated state, the determined divergence resulting in a relevant score;
determining whether the second source includes information that is redundant with the first information based on a divergence between (i) a joint density of the second information and the first information and (ii) the product of the densities of the second information and the first information, the determined divergence resulting in a redundant score; and
determining whether the second source includes information that is more relevant and less redundant than other sources by (i) for each source, subtracting from the relevant score corresponding to the source, the redundant score corresponding to the source and a cost of obtaining the information from the source, resulting in an overall score for each source, and (ii) selecting the second source if the overall score for the second source is greater than each overall score of the other sources of the plurality of sources;
determine whether the estimated state is the first state or the second state based on whether the first information and the second information together exceeds the first decision threshold or the second decision threshold, improving performance of the processor by reducing time consumed for determining whether the estimated state is the first state or the second state; and
generate a notification based on the estimated state determination.

7. A system as in claim 6 wherein the processor is configured to weight the redundant scores and the costs of obtaining the information.

8. A machine readable storage medium having stored thereon a computer program for obtaining and analyzing information to determine an estimated state of a real world, the computer program comprising a routine of set instructions for causing the machine to:
obtain first information from a first source of a plurality of sources in a database, the first information being potentially indicative of a first state of the real world and a second state of the real world;
determine that the estimated state is the first state if the first information exceeds a first decision threshold;
determine that the estimated state is the second state if the first information exceeds a second decision threshold;
obtain second information from a second of the plurality of sources if the first information does not exceed the first decision threshold and does not exceed the second decision threshold, the obtaining of the second information including:
determining whether the second source includes information that is relevant to the estimated state based on a divergence between (i) a joint density of the second information and the estimated state and (ii) the product of the densities of the second information and the estimated state, the determined divergence resulting in a relevant score;
determining whether the second source includes information that is redundant with the first information based on a divergence between (i) a joint density of the second information and the first information and (ii) the product of the densities of the second information and the first information, the determined divergence resulting in a redundant score; and
determining whether the second source includes information that is more relevant and less redundant than other sources of the plurality of sources by (i) for each source, subtracting from the relevant score corresponding to the source, the redundant score corresponding to the source and a cost of obtaining the information from the source, resulting in an overall score for each source, and (ii) selecting the second source if the overall score for the second source is greater than each overall score of the other sources of the plurality of sources;

determine whether the estimated state is the first state or the second state based on whether the first information and the second information together exceeds the first decision threshold or the second decision threshold, improving performance of the machine by reducing time consumed for determining whether the estimated state is the first state or the second state; and generate a notification based on the estimated state determination.

9. A machine readable storage medium as in claim 8 wherein the instructions cause the machine to weight the redundant scores and the costs of obtaining the information.

* * * * *